US011349816B2

(12) United States Patent
Gibbons et al.

(10) Patent No.: US 11,349,816 B2
(45) Date of Patent: May 31, 2022

(54) OBFUSCATING SOURCE CODE SENT, FROM A SERVER COMPUTER, TO A BROWSER ON A CLIENT COMPUTER

(71) Applicant: Shape Security, Inc., Mountain View, CA (US)

(72) Inventors: Kevin Gibbons, Mountain View, CA (US); Tim Disney, Mountain View, CA (US); Michael J. Ficarra, Mountain View, CA (US)

(73) Assignee: F5, Inc., Seattle, WA (US)

( * ) Notice: Subject to any disclaimer, the term of this patent is extended or adjusted under 35 U.S.C. 154(b) by 230 days.

(21) Appl. No.: 15/829,751

(22) Filed: Dec. 1, 2017

(65) Prior Publication Data
US 2018/0159830 A1    Jun. 7, 2018

Related U.S. Application Data

(60) Provisional application No. 62/429,710, filed on Dec. 2, 2016, provisional application No. 62/429,717, filed on Dec. 2, 2016.

(51) Int. Cl.
*G06F 21/00* (2013.01)
*H04L 9/40* (2022.01)
(Continued)

(52) U.S. Cl.
CPC ........ *H04L 63/0428* (2013.01); *G06F 9/4498* (2018.02); *G06F 9/45529* (2013.01);
(Continued)

(58) Field of Classification Search
CPC . H04L 63/0428; H04L 63/1475; H04L 67/02; G06F 9/4498; G06F 9/45529; G06F 21/125; G06F 8/41
See application file for complete search history.

(56) References Cited

U.S. PATENT DOCUMENTS

| 6,139,199 A | 10/2000 | Rodriguez |
| 6,151,618 A * | 11/2000 | Wahbe ................ G06F 11/3624 714/E11.211 |

(Continued)

FOREIGN PATENT DOCUMENTS

| EP | 3380974 A1 * | 10/2018 | ............. G06F 8/447 |
| EP | 3380974 B1 * | 3/2020 | ............. G06F 8/447 |

(Continued)

OTHER PUBLICATIONS

Karnalim, Oscar. Detecting source code plagiarism on introductory programming course assignments using a bytecode approach. 2016 International Conference on Information & Communication Technology and Systems (ICTS), https://ieeexplore.ieee.org/stamp/stamp.jsp?tp=&arnumber=7910274 (Year: 2016).*

(Continued)

*Primary Examiner* — Jeremiah L Avery
(74) *Attorney, Agent, or Firm* — Troutman Pepper Hamilton Sanders LLP

(57) ABSTRACT

Programs written in interpreted languages, such as JavaScript, are distributed in source form, which is helpful to attackers so that they can more easily derive the purposes and effects of a program. As discussed herein, a program's high-level code may be effectively obfuscated by transforming the program's code from its high-level programming language to low-level processor-specific language, such as x86 instructions for x86 processors, JVM bytecode for JVMs, or proprietary opcodes for a corresponding proprietary processor or interpreter. Additional obfuscation techniques can be applied the program's low-level processor-specific code.

15 Claims, 11 Drawing Sheets

(51) Int. Cl.
*G06F 9/455* (2018.01)
*H04L 67/02* (2022.01)
*G06F 21/12* (2013.01)
*G06F 9/448* (2018.01)
*G06F 8/41* (2018.01)

(52) U.S. Cl.
CPC ........ *G06F 21/125* (2013.01); *H04L 63/1475* (2013.01); *H04L 67/02* (2013.01); *G06F 8/41* (2013.01)

(56) References Cited

U.S. PATENT DOCUMENTS

| | | | |
|---|---|---|---|
| 6,594,406 B1* | 7/2003 | Hecht | G06F 3/002 382/306 |
| 6,668,011 B1* | 12/2003 | Li | H04B 1/707 370/342 |
| 6,668,325 B1 | 12/2003 | Collberg | |
| 7,620,987 B2 | 11/2009 | Shelest | |
| 7,770,106 B2 | 8/2010 | Waldman | |
| 7,975,308 B1 | 7/2011 | Satish | |
| 8,392,910 B1 | 3/2013 | Asher | |
| 8,424,090 B2 | 4/2013 | Kang | |
| 8,510,571 B1 | 8/2013 | Chang | |
| 8,661,549 B2 | 2/2014 | Chevallier-Mames | |
| 8,806,187 B1 | 8/2014 | Vemula | |
| 8,806,627 B1 | 8/2014 | Aharoni | |
| 9,241,004 B1 | 1/2016 | April | |
| 9,294,502 B1 | 3/2016 | Benishti | |
| 9,582,666 B1 | 2/2017 | Overson | |
| 9,602,543 B2 | 3/2017 | Hidayat | |
| 10,027,628 B2 | 7/2018 | Call | |
| 10,216,488 B1 | 2/2019 | Overson | |
| 2002/0099827 A1 | 7/2002 | Shah | |
| 2003/0023960 A1* | 1/2003 | Khan | H04L 29/06027 717/152 |
| 2004/0162994 A1 | 8/2004 | Cohen | |
| 2005/0183072 A1 | 8/2005 | Horning et al. | |
| 2005/0289264 A1* | 12/2005 | Illowsky | G06F 9/542 710/104 |
| 2006/0195703 A1 | 8/2006 | Jakubowski | |
| 2006/0253687 A1 | 11/2006 | Jakubowski | |
| 2007/0234070 A1 | 10/2007 | Horning | |
| 2008/0183902 A1 | 7/2008 | Cooper | |
| 2008/0222736 A1 | 9/2008 | Boodaei | |
| 2009/0077383 A1 | 3/2009 | de Monseignat | |
| 2009/0119515 A1 | 5/2009 | Nicolson | |
| 2009/0144829 A1 | 6/2009 | Grigsby | |
| 2009/0193513 A1 | 7/2009 | Agarwal | |
| 2009/0235089 A1 | 9/2009 | Ciet | |
| 2010/0005527 A1 | 1/2010 | Jeon | |
| 2010/0257354 A1 | 10/2010 | Johnston | |
| 2010/0281459 A1 | 11/2010 | Betouin | |
| 2011/0035733 A1 | 2/2011 | Horning | |
| 2011/0107077 A1 | 5/2011 | Henderson | |
| 2011/0131416 A1 | 6/2011 | Schneider | |
| 2011/0138373 A1 | 6/2011 | Lane et al. | |
| 2011/0239113 A1 | 9/2011 | Hung | |
| 2011/0307954 A1 | 12/2011 | Melnik | |
| 2012/0022942 A1 | 1/2012 | Holloway | |
| 2012/0124372 A1 | 5/2012 | Dilley | |
| 2012/0159193 A1 | 6/2012 | Spradlin et al. | |
| 2013/0152071 A1 | 6/2013 | Asher | |
| 2014/0165197 A1 | 6/2014 | Ur | |
| 2014/0223290 A1 | 8/2014 | Hathaway | |
| 2015/0039962 A1 | 2/2015 | Fonseka | |
| 2015/0096006 A1 | 4/2015 | Chu | |
| 2015/0278491 A1 | 10/2015 | Horning | |
| 2016/0359901 A1 | 12/2016 | Yang | |
| 2017/0012960 A1 | 1/2017 | Idika | |
| 2017/0024230 A1 | 1/2017 | Li | |
| 2017/0041341 A1 | 2/2017 | Wang | |
| 2017/0177870 A1* | 6/2017 | Hildebrand | G06F 21/81 |
| 2017/0264623 A1 | 9/2017 | Ficarra | |
| 2018/0077160 A1 | 3/2018 | Call | |
| 2018/0121325 A1* | 5/2018 | TerBush | G06F 11/3644 |
| 2018/0121680 A1 | 5/2018 | Wang | |
| 2018/0159830 A1 | 6/2018 | Gibbons | |
| 2019/0243951 A1 | 8/2019 | Hansen | |
| 2019/0245833 A1 | 8/2019 | Overson | |

FOREIGN PATENT DOCUMENTS

| | | |
|---|---|---|
| WO | WO2013091709 | 6/2013 |
| WO | WO 2017/007936 | 1/2017 |
| WO | 2018102767 A1 | 6/2018 |

OTHER PUBLICATIONS

Joy, Mabel Mary et al. Automated source code annotation for timing analysis of embedded software. 2012 18th International Conference on Advanced Computing and Communications (ADCOM). https://ieeexplore.ieee.org/stamp/stamp.jsp?tp=&arnumber=6563578 (Year: 2012).*
NOA, mailed on Aug. 24, 2015, re: Subramanian Varadarajan, U.S. Appl. No. 14/290,805, filed May 29, 2014.
CTFR, mailed on Jan. 14, 2015, re: Subramanian Varadarajan, U.S. Appl. No. 14/290,805, filed May 29, 2014.
CTNF, mailed on Sep. 5, 2014, re: Subramanian Varadarajan, U.S. Appl. No. 14/290,805, filed May 29, 2014.
NOA, mailed on Apr. 27, 2016, re: Siying Yang, U.S. Appl. No. 14/481,835, filed Sep. 9, 2014.
CTNF, mailed on Oct. 28, 2015, re: Siying Yang, U.S. Appl. No. 14/481,835, filed Sep. 9, 2014.
NOA, mailed on May 24, 2016, re: Siying Yang, U.S. Appl. No. 14/481,835, filed Sep. 9, 2014.
NOA, mailed on Jul. 25, 2016, re: Siying Yang, U.S. Appl. No. 14/481,835, filed Sep. 9, 2014.
CTNF, mailed on Aug. 12, 2016, re: Jarrod Overson, U.S. Appl. No. 14/706,346, filed May 7, 2015.
NOA, mailed on Oct. 19, 2016, re: Jarrod Overson, U.S. Appl. No. 14/706,346, filed May 7, 2015.
CTFR, mailed on Aug. 12, 2016, re: Subramanian Varadarajan, U.S. Appl. No. 14/923,603, filed Oct. 27, 2015.
NOA, mailed on Dec. 1, 2016, re: Subramanian Varadarajan, U.S. Appl. No. 14/923,603, filed Oct. 27, 2015.
CTNF, mailed on Apr. 4, 2017, re: Jarrod Overson, U.S. Appl. No. 15/069,667, filed Mar. 14, 2016.
CTNF, mailed on Aug. 4, 2017, re: Siying Yang, U.S. Appl. No. 15/242,062, filed Aug. 19, 2016.
NOA, mailed on Sep. 18, 2017, re: Xinran Wang, U.S. Appl. No. 14/286,324, filed May 23, 2014.
NOA, mailed on Oct. 25, 2017, re: Xinran Wang, U.S. Appl. No. 14/286,324, filed May 23, 2014.
CTFR, mailed on Oct. 30, 2017, re: Jarrod Overson, U.S. Appl. No. 15/069,667, filed Mar. 14, 2016.
NOA, mailed on Nov. 29, 2017, re: Xinran Wang, U.S. Appl. No. 14/286,324, filed May 23, 2014.
CTFR, mailed on Feb. 23, 2018, re: Wesley Hayes, U.S. Appl. No. 15/011,237, filed Jan. 29, 2016.
CTFR, mailed on Apr. 9, 2018, re: Siying Yang, U.S. Appl. No. 15/242,062, filed Aug. 19, 2016.
CTNF, mailed on May 23, 2018, re: Jarrod Overson, U.S. Appl. No. 15/069,667, filed Mar. 14, 2016.
CTNF, mailed on Feb. 1, 2018, re: Nwokedi Idika, U.S. Appl. No. 15/204,710, filed Jul. 7, 2016.
CTNF, mailed on Jul. 31, 2018, re: Wesley Hales, U.S. Appl. No. 15/011,237, filed Jan. 29, 2016.
NOA, mailed on Sep. 19, 2018, re: Nwokedi Idika, U.S. Appl. No. 15/204,710, filed Jul. 7, 2016.
NOA, mailed on Oct. 24, 2018, re: Jarrod Overson, U.S. Appl. No. 15/069,667, filed Mar. 14, 2016.
NOA, mailed on Nov. 27, 2018, re: Nwokedi Idika, U.S. Appl. No. 15/204,710, filed Jul. 7, 2016.
CTNF, mailed on Jan. 9, 2019, re: Michael J. Ficarra, U.S. Appl. No. 15/453,048, filed Mar. 8, 2017.

(56) References Cited

OTHER PUBLICATIONS

CTNF, mailed on Dec. 26, 2018, re: Siying Yang, U.S. Appl. No. 15/242,062, filed Aug. 19, 2016.
CTFR, mailed on Jan. 17, 2019, re: Wesley Hales, U.S. Appl. No. 15/011,237, filed Jan. 29, 2016.
CTFR, mailed on Jun. 7, 2019, re: Siying Yang, U.S. Appl. No. 15/242,062, filed Aug. 19, 2016.
CTNF, mailed on Jun. 5, 2019, re: Xinran Wang, U.S. Appl. No. 15/859,694, filed Jan. 1, 2018.
CTNF, mailed on Aug. 8, 2019, re: Marc R. Hansen, U.S. Appl. No. 16/233,455, filed Dec. 27, 2018.
CTFR, mailed on Oct. 1, 2019, re: Xinran Wang, U.S. Appl. No. 15/859,694, filed Jan. 1, 2018.
CTNF, mailed on Sep. 30, 2019, re: Justin Call, U.S. Appl. No. 15/808,504, filed Nov. 9, 2017.
CTFR, mailed on Nov. 20, 2019, re: Siying Yang, U.S. Appl. No. 15/242,062, filed Aug. 19, 2016.
CTNF, mailed on Dec. 13, 2019, re: Wesley Hayes, U.S. Appl. No. 15/011,237, filed Jan. 29, 2016.
CTNF, mailed on Jan. 2, 2020, re: Xinran Wang, U.S. Appl. No. 15/859,694, filed Jan. 1, 2018.
In-the-wire authentication: Protecting client-side critical data fields in secure network transactions, Jan. 14, 2009.
International Search Report, dated Oct. 11, 2016, PCT/US16/41337, Shape.
International Search Report for PCT/US17/21409, dated May 23, 2017, Shape.
https://urldefense.com/v3/_https:/web.archive.org/web/20210624011617if_/https:/api.nike.com/149e9513-01fa-4fb0-aad4-566afd725d1b/2d206a39-8ed7-437e-a3be-862e0f06eea3/ips.js_;!!PoWaflF1wM8F24I!I9vJGvL53pB9jSk8XN5fQgaKliP6Fd-VbGB59ABduqE2UXU8m8b7ZQC5L8gXBt_mUgKaw$, Archived on Jun. 24, 2021 and retrieved from the internet archive on Aug. 2, 2021.
"A Brief Survey of Code Obfuscation Techniques", https://urldefense.com/v3/_https:/chris124567.github.io/2021-06-23-survey-obfuscation/_PoWaflF1wM8F24III9vJGvL53pB9jSk8XN5fQgaKliP6Fd--VbGB59ABduqE2UXU8m8b7ZQC5L8gXBvVuxOMbg$, Jun. 23, 2021.

* cited by examiner

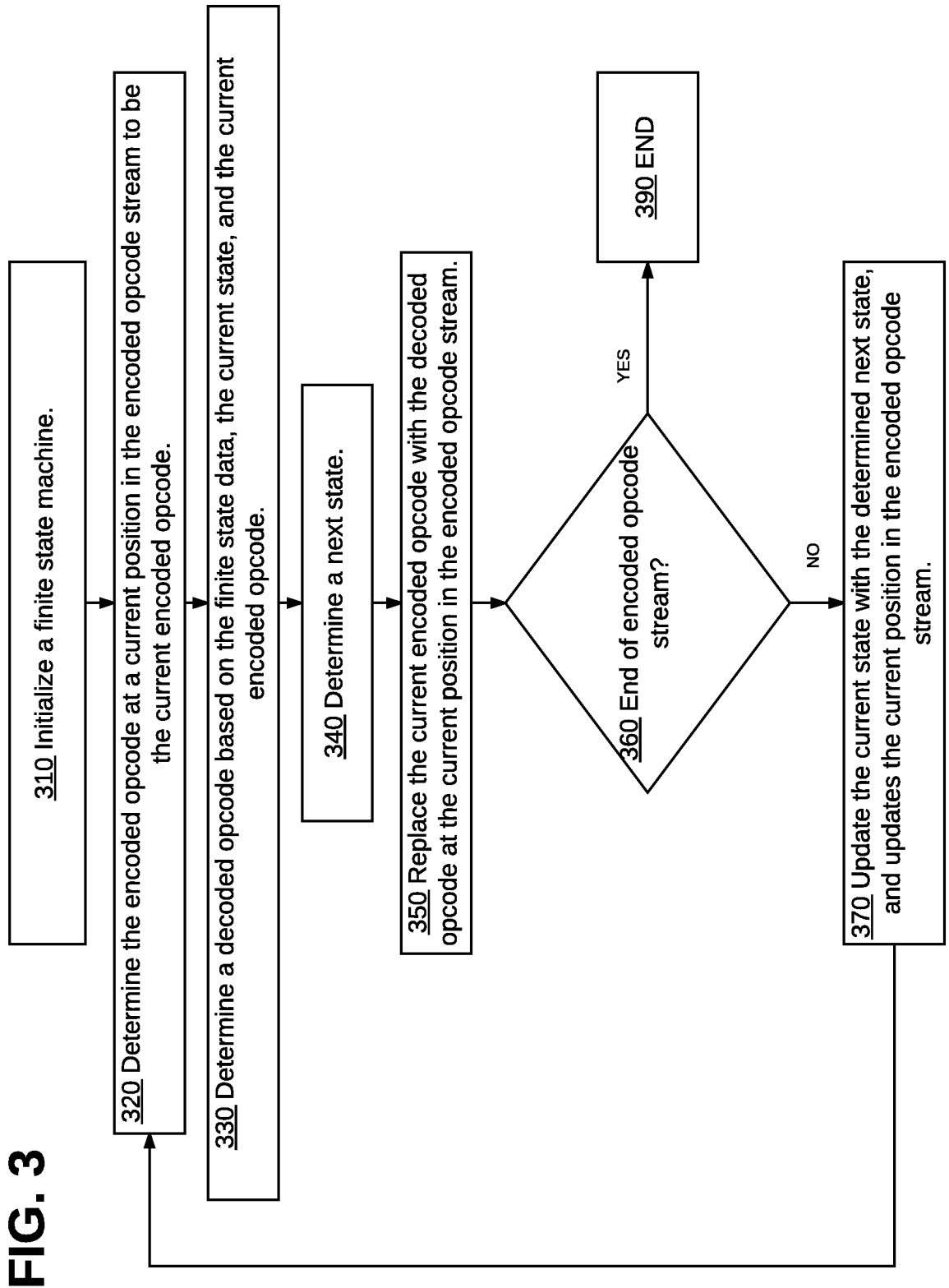

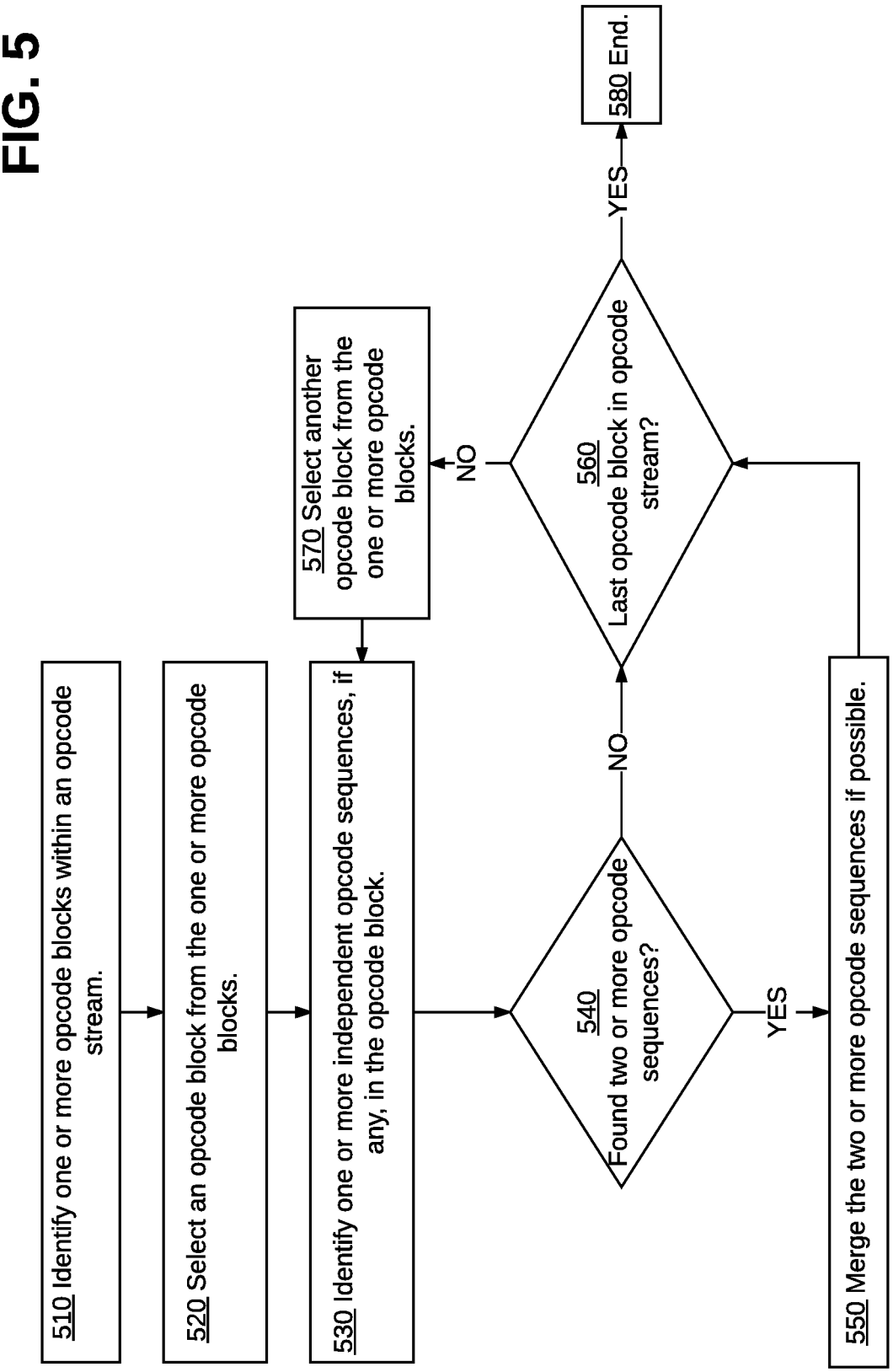

OBFUSCATING SOURCE CODE SENT, FROM A SERVER COMPUTER, TO A BROWSER ON A CLIENT COMPUTER

BENEFIT CLAIM

This application claims the benefit under 35 U.S.C. 119(e) of U.S. Provisional Application No. 62/429,710, filed Dec. 2, 2016, and U.S. Provisional Application No. 62/429,717, filed Dec. 2, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to obfuscating code that is sent to a browser on a client computer to cause an attacker to spend more time to determine what the code will do and how to subvert the code.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Program obfuscation is a class of techniques used to protect software from adversarial analysis. For example, a web page may include JavaScript to gather and send data, to a server computer to process, according to a particular protocol. An attacker may try to review the JavaScript to determine how to send false or misleading data in the particular format that the server is expecting to receive. Program obfuscation changes a program in such a way that the original observable behavior is maintained, but aspects of the original program are more difficult for the attacker to understand.

Obfuscation techniques on high-level source code, such as C/C++ or JavaScript, may comprise transformation techniques such as array splitting and dead code insertion. While source-level obfuscation techniques can be powerful, they are inherently bound by the intentional expressive limitations or structures of any high-level language, such as objects, types, blocks, functions, and callbacks. Although an obfuscation of a high-level language might change the names of various structures, attackers can use the expressive limitations and structures of the high-level language to deduce the purpose, operations, and control flow of the program.

Programs written in interpreted languages, such as JavaScript, are distributed in source form, which is helpful to attackers so that they can more easily derive the purposes and effects of a program. Some may attempt to obfuscate JavaScript code by using a minifier. A minifier takes a program's code and strips out whitespaces and comments, replaces meaningful variable names with short auto-generated names, and replaces verbose constructions with equivalent terse representations. However, the minified code that a minifier produces will still retain the high-level structure and organization of the program's original code.

SUMMARY

The appended claims may serve as a summary of the invention.

BRIEF DESCRIPTION OF THE DRAWINGS

In the drawings:

FIG. 3 illustrates a process for a processor to decode opcodes in an encoded opcode stream using a finite state machine in an example embodiment.

FIG. 5 illustrates a process for merging two independent opcode sequences, in a opcode block, within an opcode stream, in an example embodiment.

Figure 9:
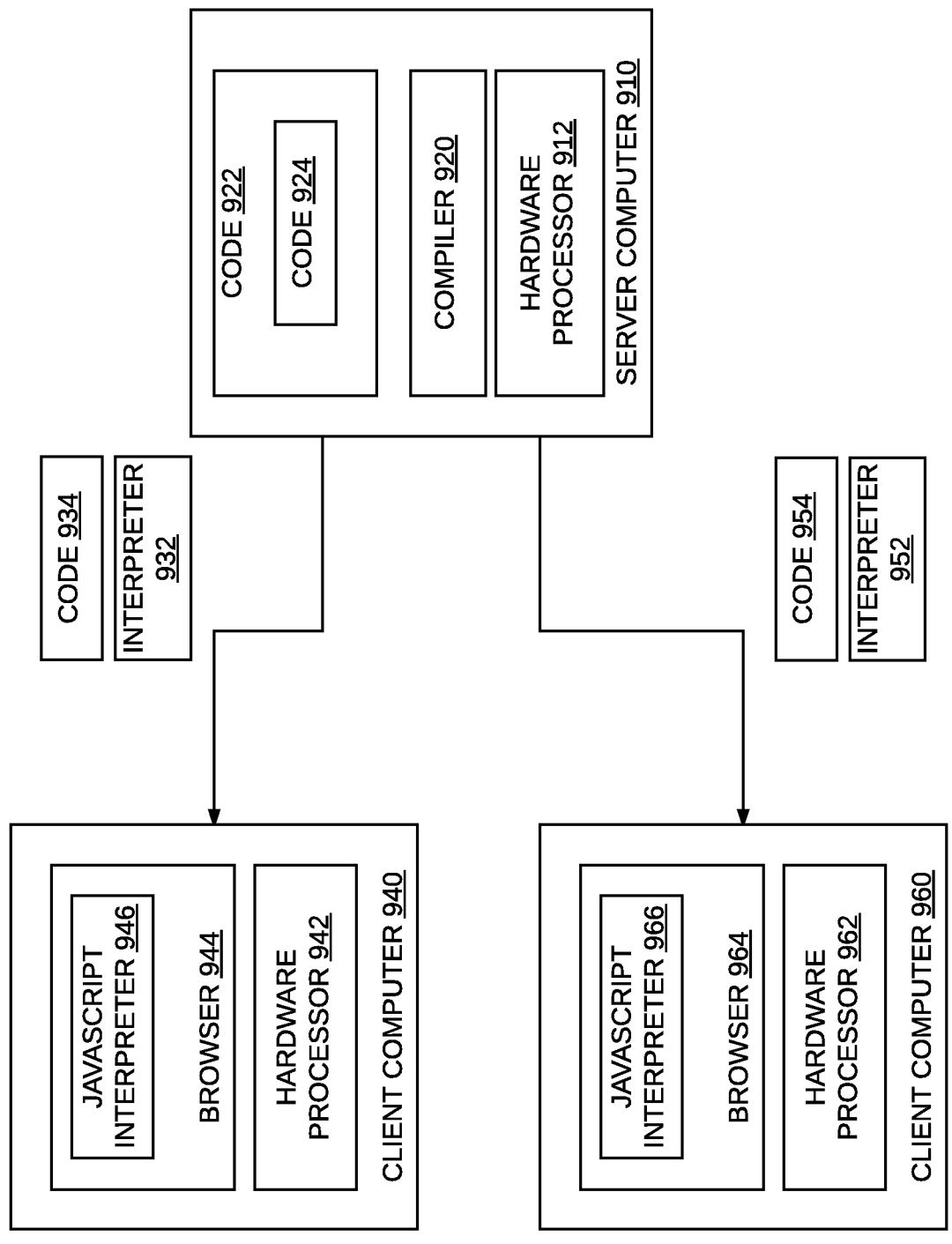
FIG. 9 illustrates a computer system comprising a server computer that can compile an original set of code for a particular type of processor into one or more new sets of code and corresponding interpreters, and send each new set of code with a new version of an interpreter to a different client computer, in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, compiler 920 in FIG. 9 may be described with reference to several components illustrated in FIG. 10 and discussed in detail below, but using the particular arrangement illustrated in FIG. 9 is not required in other embodiments.

While the instructions or code discussed in many example embodiments may be JavaScript instructions or one or more other standard or proprietary programming languages or instruction sets, in other embodiments, the instructions or code received and generated may be any other standard or proprietary programming languages or instruction sets configured to be executed by one or more processors on one or more computers.

A process may be, or part of, an application or module, executed by one or more processors. For example, a process may be a compiler, linker, post-compilation tool, interpreter, or other application or module executed by one or more processors.

For the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or two or more elements unless expressly stated otherwise. For example, a set of instructions may comprise one or more instructions. A set of opcode sequence pairs, discussed further herein, may comprise zero, one, two, or more opcode sequence pairs.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

DETAILED DESCRIPTION

Embodiments are described herein according to the following outline:
1.0 General Overview
1.1 Opcodes
1.2 Compilers
1.3 Interpreters
2.0 Using Compilers to Obfuscate Code
3.0 Obfuscating Opcodes
3.1 Changing Opcodes in an Instruction Set
3.2 Shuffling Opcodes
4.0 Encoding and Decoding Opcodes
4.1 Generating a Finite State Table to Encode and Decode Opcodes
4.2 Encoding Opcodes based on a Finite State Table
4.3 Generating a New Target Processor based on Finite State Data
4.4 Executing an Encoded Opcode Stream based on a Finite State Machine
  4.4.1 In-Place Execution of an Encoded Opcode Stream
  4.4.2 Branching During In-Place Execution of an Encoded Opcode Stream
  4.4.3 Synchronizing Current State between a Target Processor and Compiler
5.0 Merging Sets of two or more Opcodes
  5.1 Managing a Stack
  5.2 Processing an Opcode Sequence using a Stack
    5.2.1 Example of Merging Two Independent Opcode Sequences
  5.3 Independent Opcode Sequences
  5.4 Example Process for Merging Independent Opcode Sequences in an Opcode Block
    5.4.1 Identifying Opcode Blocks in an Opcode Stream
    5.4.2 Identifying Independent Opcode Sequences in an Opcode Block
    5.4.3 Finding Additional Independent Opcode Sequences from the Current Position
    5.4.4 Finding an Independent Opcode Sequence from a New Position
    5.4.5 Finding Two or More Opcode Sequences in an Opcode Block to Merge
    5.4.6 Selecting a Source-Target Opcode Pair
    5.4.7 Merging a Source-Target Opcode Pair
6.0 Using a Compiler to Obfuscate Code that a Server Sends to a Client Computer
6.1 Network Topology
6.2 Systems and Method for Obfuscating Code Sent to one or more Client Computers
7.0 Implementation Mechanisms—Hardware Overview
8.0 Other Aspects of Disclosure 1.0 General Overview As discussed herein, a program's high-level code may be effectively obfuscated by transforming the program's code from its high-level programming language to low-level processor-specific language, such as x86 instructions for x86 processors, JVM bytecode for JVMs, or proprietary opcodes for a corresponding proprietary processor or interpreter. Additional obfuscation techniques can be applied the program's low-level processor-specific code.

1.1 Opcodes

Computer processors can perform a set of operations, such as add, subtract, multiply, or divide. A computer processor may associate each operation in the set of operations with a unique value called an opcode. When a processor receives an opcode, the processor performs the operation associated with the opcode. The set of opcodes that a processor has associated with a set of operations is called an instruction set.

Different types of processors can perform different sets of operations or may associate an operation with different opcodes. Accordingly, two types of processors may have different instruction sets. For example, a first type of processor may associate a first opcode with an addition operation, and a second type of processor may associate a second, different opcode with the addition operation. Also for example, a first type of processor may associate an opcode with an operation that a second type of processor may not have a single equivalent operation.

A opcode can be a value represented by one or more bytes. Accordingly, an opcode may be referred to as a bytecode. Code, or a set of code, comprising one or more opcodes may be referred to as bytecode, or a set of bytecode.

1.2 Compilers

A compiler transforms code written according to one language into code in another language. For example, a compiler may transform a set of C code into a first set of opcodes for a first, particular type of processor with a first instruction set. Another compiler may transform the set of C code into a second, different set of opcodes for a second, different type of processor with a second, different instruction set. If a first computer with the first type of processor executes the first set of opcodes, and the second computer with the second type of processor executes the second set of opcodes, then the first processor and the second processor may produce the same result. A processor executing an opcode may mean a processor executing the operation associated with the opcode in that processor.

1.3 Interpreters

An interpreter is software that, when executed by a processor, simulates a particular type of processor. The type of processor that the interpreter simulates need not be the same type of processor as the underlying processor. For purposes of illustrating a clear example, assume a computer has a first type of processor that associates a first opcode with a particular operation, and the computer is executing an interpreter that is simulating a second type of processor that associates a second, different opcode with the same operation. In response to receiving the second opcode, the interpreter translates the second opcode to the first opcode and sends the first opcode to the processor.

An interpreter may support opcodes or operations that the underlying hardware processor does not directly support. However, the interpreter may send the underlying hardware processor one or more opcodes that cause the hardware processor to perform a series of operations that produce the same result and are therefore functionally equivalent. For example, a processor may associate a multiplication operation with a first opcode. However, the processor may execute an interpreter that associates an exponential operation with a second opcode. In response to receiving the second opcode, the interpreter may send a series of opcodes, which include several instances of the first opcode, in a particular order to the hardware processor. For each opcode in the series of opcodes received from the interpreter, the hardware processor will perform the operation associated with the opcode to produce the same result that the exponential operation would have produced.

An interpreter can be executed by another interpreter, which in turn is executed by a series of one or more other interpreters, which is executed by one or more hardware processors. For example, a JavaScript interpreter can be executed by a Java interpreter, which is part of a browser being executed on a computer by one or more hardware processors. Accordingly, a processor may refer to a hardware processor or an interpreter. However, even if an interpreter is being executed by another interpreter, which is being executed by another interpreter, and so on, eventually the stack of interpreters is being executed by one or more hardware processors.

2.0 Using Compilers to Obfuscate Code

Code written in one language may be easier for humans to read than code created for an interpreter or hardware processor. For example, many humans can determine that, from the plus character, a JavaScript interpreter will add the value of X with the value of Y in response to receiving in the following line of code:

LINE 01: X+Y

However, a human would have to analyze the behavior of a processor to determine that the opcode value 82 in the following code will cause a processor to add the value of X with the value of Y:

LINE 01: 82 X Y

One method of obfuscation is compiling a first set of code into a second set of code for a new target processor to execute. For purposes of illustrating a clear example, assume Snippet 1 is a portion of a first set of code for a first target processor with a first instruction set.

Snippet 1:

LINE 01: Z=(X+Y)*2;

If the first target processor receives the code in Snippet 1, then the first target processor sums the two values of X and Y, multiplies the sum by two, and assigns the product to the variable Z.

A compiler could transform or compile the first set of code for a first target processor according to a first instruction set into a second, different set of code for a different processor with a second, different instruction set. For example, the computer could compile the code in Snippet 1 to produce the code in Snippet 2:

Snippet 2:

LINE 01: 87 X Y Z
LINE 02: 23 Z 2 Z

In Snippet 2, the first line includes opcode 87, which according to the second instructions set may cause the second target processor to sum the values of X and Y and assign the sum to variable Z. The second line includes opcode 23, which according to the second instruction set may cause the second target processor to multiply the sum assigned to variable Z after the first line is executed, and assign the product to variable Z. These opcodes are merely examples of possible opcodes that could be used for a target interpreter with a particular instruction set.

In the foregoing example, the compiler generated a new set of code that is different than the original set of code, which may create difficulty for humans when determining what the second set of code is going to cause the second target processor to do. However, if the new, second set of code is executed by the second target processor, then the second target processor will generate the same output as first target processor executing the first set of code. Accordingly, the second set of code with the second target processor is functionally equivalent to the first set of code with the first target processor.

3.0 Obfuscating Opcodes

People may reverse engineer each opcode in an instruction set for a target interpreter by observing the behavior or output of the target interpreter in response to receiving one or more opcodes from the instruction set. Obfuscating the opcodes in an instruction set for a target interpreter may make reverse engineering a set of compiled code more difficult.

3.1 Changing Opcodes in an Instruction Set

A compiler may obfuscate opcodes by changing the values of the opcodes in an instruction set for a target processor. Each time a compiler compiles an original set of code for a target processor, the compiler can change the opcodes in the target instruction set to produce a new target instruction set and a new target interpreter that understands the new instruction set, and generate a new set of code according to the new target instruction set. For purposes of illustrating a clear example, assume the following:

- A compiler is configured to compile a set of JavaScript code into a new set of code for an original target processor with an original target instruction set;
- The set of JavaScript code includes the code in Snippet 1;
- The JavaScript opcode for the add operator is "+";
- The original target processor has an original target instruction set;
- The original target instruction set associates one or more operations of the original target processor with one or more opcodes;
- For each operation identified in the original target instruction set, the operation is associated with an opcode that is not associated with any other operation in the original target instruction set;
- The opcode for the add operation in the original target instruction set is 87;
- The opcode for the multiply operation in the original target instruction set is 23.

If an opcode obfuscation compiler flag is not set, then the compiler generates a set of code according to the original target instruction set, and the set of code comprises the code in Snippet 2. If, however, the opcode obfuscation compiler flag is set, the compiler generates a first new target processor with a first new target instruction set. For each operation of one or more operations in the original target instruction set, a new opcode is assigned to the operation that is different than the opcode that is assigned to the operation in the original target instruction set. For each operation identified in the first new target instruction set, the operation is associated with an opcode that is not associated with any other operation in the first new target instruction set. For purposes of illustrating a clear example, assume the opcode for the add operation in the first new target instruction set is 44 and the opcode for the multiply operation in the first new target instruction set is 72. Accordingly, the compiler will generate a first new set of code that comprises the code in Snippet 3.

Snippet 3:
LINE 01: 44 X Y Z
LINE 02: 72 Z 2 Z

If the first new target processor executes the first new set of code, the first new target processor will generate the same result as if the JavaScript interpreter had executed the set of JavaScript code. Therefore, the first new target processor and the first new set of code are functionally equivalent to the set of JavaScript code.

If the compiler is executed on the set of JavaScript code again and the opcode obfuscation compiler flag is set, then the compiler generates a second new target processor with a second new target instruction set. For each operation of one or more operations in the original target instruction set, a new opcode is assigned to the operation, and the new opcode is different than the opcode that is assigned to the operation in the original target instruction set and the first new target instruction set. For each operation identified in the second new target instruction set, the operation is associated with an opcode that is not associated with any other operation in the second new target instruction set. For purposes of illustrating a clear example, assume the opcode for the add operation in the first new target instruction set is 66 and the opcode for the multiply operation in the first new target instruction set is 68. Accordingly, the compiler will generate a second new set of code that comprises the code in Snippet 4.

Snippet 4:
LINE 01: 66 X Y Z
LINE 02: 68 Z 2 Z

If the second new target processor executes the second new set of code, the second new target processor will generate the same result as if the JavaScript interpreter had executed the set of JavaScript code or the first new target processor executed the first new set of code. Therefore, the second new target processor and the second new set of code are functionally equivalent to the set of JavaScript code, and the second new target processor and the second new set of code are functionally equivalent to the first new target processor and the first new set of code.

3.2 Shuffling Opcodes

A compiler may generate a new target instruction set based on an original target instruction set by shuffling opcodes in the original target instruction set. For example, the compiler may pseudorandomly swap opcodes of two or more pseudorandomly selected operations in the original target instruction set to produce the new target instruction set.

4.0 Encoding and Decoding Opcodes

A compiler may obfuscate opcodes by encoding one or more opcodes, and produce a modified target processor that can decode the encoded opcodes. A compiler may encode opcodes using a key pair. A key pair may comprise an encoding key and a decoding key. The encoding key and the decoding key in a key pair may be the same. Accordingly, a key pair may refer to an encoding key and a corresponding decoding key, or a single key that is both the encoding key and decoding key.

A key in a key pair may comprise one or more values or structured data. For example, a key pair may comprise state data in a finite state table, which is discussed further herein. The compiler and the new target processor may be finite state machines that act in concert when the compiler and the new target processor use the same finite state table.

Each time a compiler compiles or produces a new set of code, the compiler may generate a key pair or select a key pair from a key pair database, encode the opcodes in the new set of code with the encoding key in the key pair, and produce a new target processor with the decoding key in the key pair. The new target processor can use the decoding key to decode the encoded opcodes in the new set of code.

One or more key pairs may be pre-generated and stored in a database. For each key pair stored in the database, a corresponding target processor may be pre-built with the decoding key and associated with the key pair in the database. Accordingly, a compiler need not generate a new target processor when the compiler produces the new set of code with the encoded opcodes based on an encoding key from a key pair in the database. A compiler may produce a new target processor by retrieving the corresponding target processor from the database.

4.1 Generating a Finite State Table to Encode and Decode Opcodes

Figure 1:
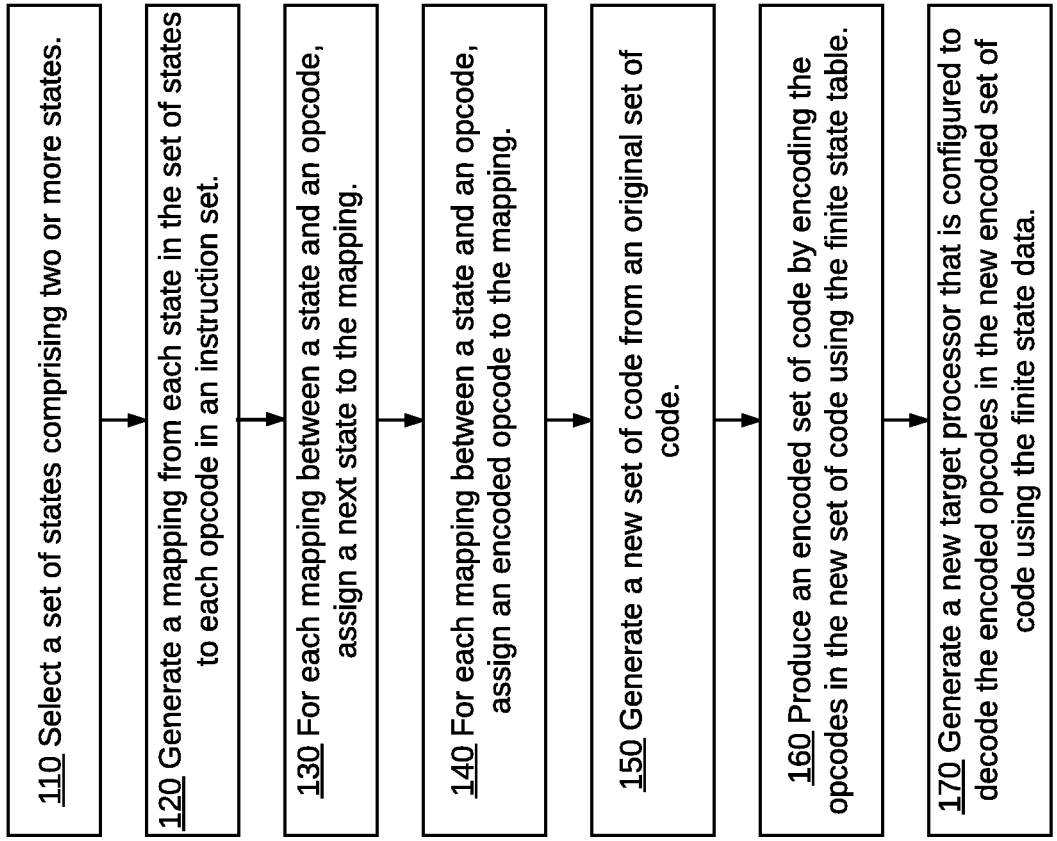
FIG. 1 illustrates a process for generating a finite state table and using the finite state table as a key pair to encode and decode opcodes in an example embodiment.

FIG. 1 illustrates a process for generating a finite state table and using the finite state table as a key pair to encode and decode opcodes in an example embodiment. In step 110, a computer process, such as a compiler other software or hardware component(s), selects a set of states comprising two or more states. Each state in the set of states is unique and may comprise one or more numbers, letters, symbols, or other values. The states in the set of states need not start at zero, monotonically increase, or change uniformly. For example, a compiler may pseudorandomly select a number that will be the size of the set of states. The compiler may also pseudorandomly select each state in the set of states. However, for purposes of illustrating a clear example, assume the compiler pseudorandomly selects the size of the set of states to be two, the first state to be zero, and the second state to be one.

In step 120, the computer process generates a mapping from each state in the set of states to each opcode in an instruction set. For purposes of illustrating a clear example, assume a target instruction set includes three opcodes: [0, 1, 2]. Table 1 illustrates the mappings between each state in the set of states and the opcodes, which are referred to as decoded opcodes.

TABLE 1

| State | Decoded Opcode |
| --- | --- |
| 0 | 0 |
| 0 | 1 |
| 0 | 2 |
| 1 | 0 |

TABLE 1-continued

| State | Decoded Opcode |
|---|---|
| 1 | 1 |
| 1 | 2 |

In step 130, for each mapping between a state and an opcode, the computer process assigns a next state to the mapping. For each mapping between a state and an opcode, the next state can be any state from the set of states. For example, the compiler may set the next state to 0; otherwise, the compiler may pseudorandomly select any state from the set of states to be the next state. Table 2 illustrates the next state that the compiler assigned to each mapping in Table 1 in this example.

TABLE 2

| State | Decoded Opcode | Next State |
|---|---|---|
| 0 | 0 | 1 |
| 0 | 1 | 0 |
| 0 | 2 | 1 |
| 1 | 0 | 0 |
| 1 | 1 | 0 |
| 1 | 2 | 1 |

In an embodiment, the compiler may select one or more opcode not to encode. If an opcode is associated with an operation that causes a jump in control and the opcode is not the same as an encoded opcode, then the compiler need not create a mapping between any state and the opcode.

In an embodiment, the compiler may select, or be configured to select, one or more opcodes not to encode. Accordingly, the compiler need not create a mapping between the one or more opcodes and a state. If an encoded opcode matches an opcode in the one or more opcodes that should not be encoded, then the compiler may replace the encoded opcode with a different opcode. For example, if the instruction set of the target processor includes 3 as an opcode that is associated with an operation and 3 is not in a set of encoded opcodes, then the compiler need not create a mapping between state zero and the opcode with a value of 3. If the compiler receives an opcode set to 3 in an opcode stream and determines that the finite state table does not include an encoded opcode value of 3, then the compiler set the next state to be the initial state as discussed further herein. If the target processor receives an opcode set to 3 in an opcode stream and determines that the finite state table does not include an encoded opcode value of 3, then the target processor may determine that the opcode is not encoded and may execute the operation associated with the opcode and set the next state to be the initial state as discussed further herein. Accordingly, the compiler may generate a finite state table that is a key pair for an instruction set that comprises a subset of the target processor's instruction set.

In step 140, for each mapping between a state and an opcode, the computer process assigns an encoded opcode to the mapping. Each encoded opcode may be unique for each state in the set of states. For purposes of illustrating a clear example, assume that the decoded opcodes in the instruction set are in the following order: 0, 1, 2. For each state in the set of states, the compiler may produce a set of encoded opcodes by pseudorandomly shuffling two or more of the decoded opcodes in the ordered instruction set, and assigning an opcode from the shuffled set of opcodes to each mapping with the state. In this example, the compiler may generate the following first shuffled encoded opcode set for the first state, 0: 2, 0, 1; and the compiler may generate the following second shuffled encoded opcode set for the second state, 1: 1, 2, 0. The compiler assigns the first shuffled encoded opcode set to the state-and-decoded-opcode mappings with the first state, and the second shuffled encoded opcode set to the state-and-decoded-opcode mappings with the second state, as illustrated in Table 3. Table 3 illustrates the finite state table generated by the compiler so far in this example.

TABLE 3

| State | Decoded Opcode | Next State | Encoded Opcode |
|---|---|---|---|
| 0 | 0 | 1 | 2 |
| 0 | 1 | 0 | 0 |
| 0 | 2 | 1 | 1 |
| 1 | 0 | 0 | 1 |
| 1 | 1 | 0 | 2 |
| 1 | 2 | 1 | 0 |

In step 150, the process generates a new set of code from an original set of code. For purposes of illustrating a clear example, assume that the compiler compiles a set of JavaScript code and produces the code in Snippet 5.
Snippet 5
LINE 01: 0 A B
LINE 02: 1 D E
LINE 03: 2 4

4.2 Encoding Opcodes Based on a Finite State Table

In step 160, the process produces an encoded set of code by encoding the opcodes in the new set of code using the finite state table. Continuing with the current example, the compiler reads the opcodes from the new set of code in the same order as the opcodes are listed in the new set of code. The ordered set of opcodes in the new set of code may be referred to as an opcode stream. The compiler may sequentially step through one or more opcodes in the opcode stream and replace each opcode with an encoded opcode. An opcode in an opcode stream, before the opcode is encoded, may also be referred to herein as a decoded opcode.

An opcode stream may be denoted herein as a comma-separated list of opcodes surrounded by square brackets. The leftmost opcode in the comma-separated list of opcodes is the first opcode in the opcode stream. An opcode stream may be derived for a set of code. For example, the following opcode stream may be generated from the code in Snippet 5: [0, 1, 2]. As discussed further herein, one or more opcodes in an opcode stream may be encoded, and the opcode stream may be referred to as an encoded opcode stream.

A caret indicates the current position of a process, such as a finite state machine, traversing through the opcode stream. For example, [0, ^1, 2], may indicate that the current position of a finite state machine is the second opcode in the opcode stream.

Figure 2:
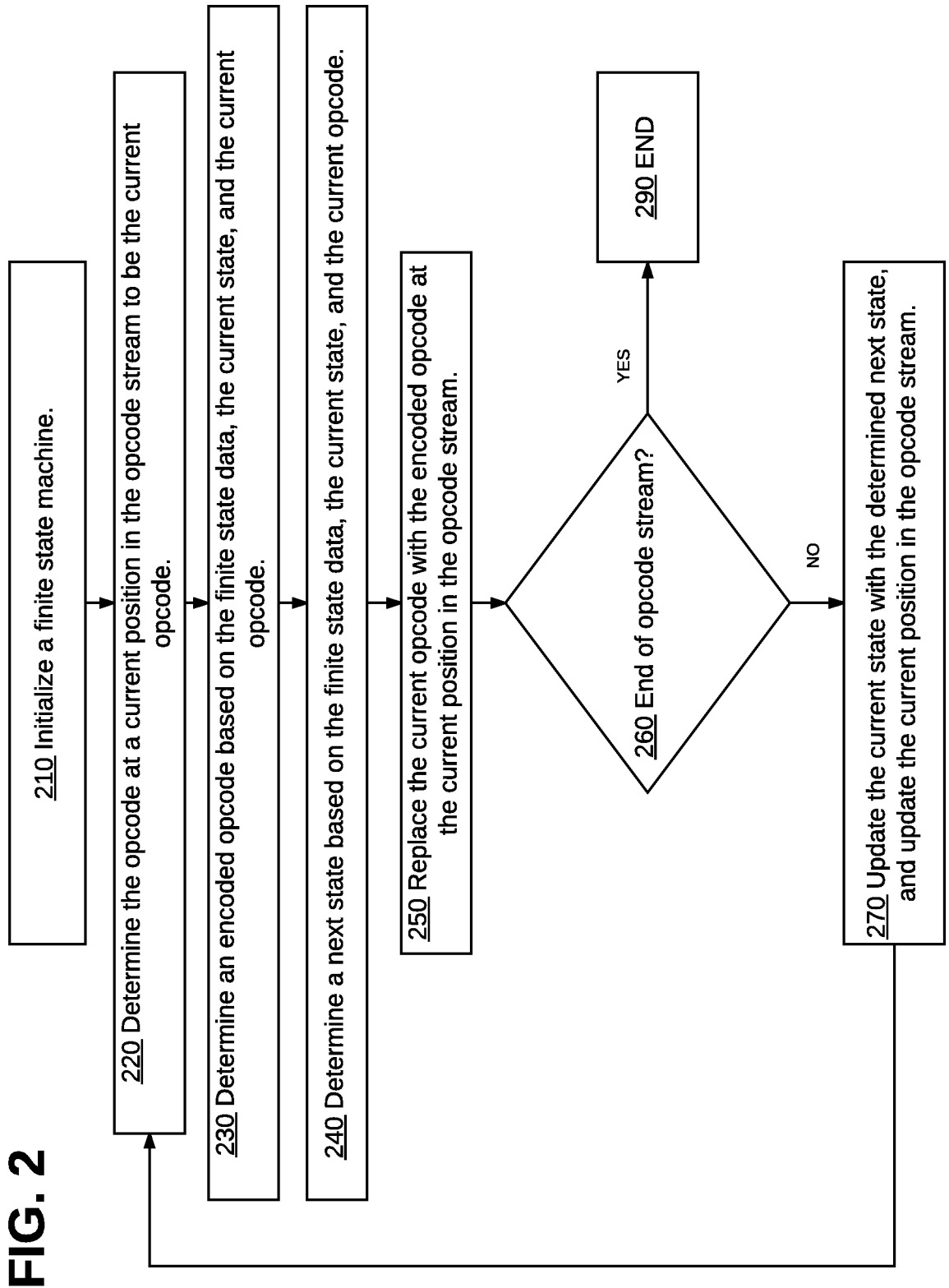
FIG. 2 illustrates a process for encoding opcodes in an opcode stream using a finite state machine based on a set of finite state data in an example embodiment.

FIG. 2 illustrates a process for encoding opcodes in an opcode stream using a finite state machine based on a set of finite state data in an example embodiment. For purposes of illustrating a clear example, assume the opcode stream is generated from a set of code that starts with the code in Snippet 5. Accordingly, the opcode stream is: [0, 1, 2, . . . ].

In step 210, a process initializes a finite state machine. For purposes of illustrating a clear example, assume the following:

The process is a compiler, such as one or more of the compilers discussed herein, that comprises a finite state machine, with the finite state data in Table 3.

The initial state is defined to be 0.

The compiler sets a current position in the opcode stream to be the first opcode in the opcode stream and sets a current state to be the initial state, which in this example is 0. The following is the current state of the compiler in the opcode stream in this example: [^0, 1, 2, . . . ].

In step 220, the finite state machine determines the opcode at a current position in the opcode stream to be the current opcode. For example, the compiler determines the current opcode is 0.

In step 230, the finite state machine determines an encoded opcode based on the finite state data, the current state, and the current opcode. Continuing with the current example, the compiler determines that 2 is the encoded opcode based on the finite state data, the current state (0), and the current opcode (0).

In step 240, the finite state machine determines a next state for the finite state machine based on the finite state data, the current state, and the current opcode. Continuing with the current example, the compiler selects 1 as a next state for the compiler based on the current state (0) and the current (decoded) opcode (0).

In step 250, the finite state machine replaces the current opcode with the encoded opcode at the current position in the opcode stream. Continuing with the current example, the compiler replaces the current opcode (0), which corresponds to the opcode in Line 1 of Snippet 5, with the determined encoded opcode (2) at the current position in the opcode stream. The following is the current state of the compiler in the opcode stream in this example: [^2, 1, 2, . . . ].

In step 260, the finite state machine determines whether the current position is at the end of the opcode stream. If so, the finite state machine may proceed to step 290; otherwise, the finite state machine may proceed to step 270. Continuing with the current example, the compiler determines that the current position is not at the end of the opcode stream. In response, the compiler proceeds to step 270.

In step 270, the finite state machine updates the current state with the determined next state, and updates the current position in the opcode stream. For example, the compiler updates the current state to 1, which is the current value of the next state. The compiler also increments the current position in the opcode stream by one and revisits step 220. The following is the current state of the compiler in opcode stream: [2, ^1, 2, . . . ].

In revisited step 220, the compiler determines the current opcode is 1, based on the current position in the opcode stream.

In revisited step 230, the compiler determines that 2 is the encoded opcode, based on the finite state data, the current state (1), and the current opcode (1).

In revisited step 240, the compiler determines that the next state is 0 based on the finite state data, the current state (1), and the current opcode (1) or the encoded opcode (2).

In revisited step 250, the compiler replaces the current opcode (1), which corresponds to the opcode in Line 2 of Snippet 5, with the determined encoded opcode (2) at the current position in the opcode stream. The following is the current state of the compiler in the opcode stream in this example: [2, ^2, 2, . . . ].

In revisited step 260, the compiler determines that the current position in the opcode stream is not at the end of the opcode stream. In response, the compiler revisits step 270.

In revisited step 270, the compiler updates the current state to 0, which is the current value of the next state. The compiler also increments the current position in the opcode stream by one and revisits step 220. The following is the current state of the compiler in the opcode stream in this example: [2, 2, ^2, . . . ].

The compiler repeats step 220 through step 260 until the current position of the compiler is at the end of the opcode stream, in which case the compiler proceeds to step 290. In the current example, the opcode stream is now the following encoded opcode stream: [2, 2, 1, . . . ].

In step 290, the process for encoding the opcodes returns to step 160 in FIG. 1, which produces a new encoded set of code by replacing the opcodes in the set of code with the encoded opcodes in the encoded opcode stream. Continuing with the current example, the compiler replaces the opcodes in the set of code from step 210 with the opcodes from the encoded opcode stream. Snippet 6 shows the new encoded set of code that the compiler generates from the opcode stream generated from Snippet 5.

Snippet 6:
LINE 01: 2 A B
LINE 02: 2 D E
LINE 03: 1 4

In one or more examples discussed herein, a process replaces one or more opcodes in-place in an opcode stream with different or encoded opcodes. However, a process may produce a new opcode stream with the different or encoded opcodes.

4.3 Generating a New Target Processor Based on Finite State Data

In step 170, the process generates a new target processor that is configured to decode the encoded opcodes in the new encoded set of code using the finite state data. For example, if an original target processor is configured to decode an opcode stream using a finite state machine and the original target processor has a block of memory allocated for finite state data, then the compiler may copy the finite state data into the block of memory to produce a new target processor that can decode the encoded opcodes.

4.4 Executing an Encoded Opcode Stream Based on a Finite State Machine

The new target processor will produce the same output executing the new encoded set of code as a processor executing the original set of code. Accordingly, the new target processor and the encoded set of code are functionally equivalent to the original set of code that the compiler used to produce the new encoded set of code.

A new target processor may execute the new coded set of code by decoding the new encoded set of code to produce a decoded set of code, and execute the decoded set of code. FIG. 3 illustrates a process for a processor to decode opcodes in an encoded opcode stream using a finite state machine in an example embodiment.

In step 310, the processor initializes a finite state machine. Continuing with the current example, the new target processor, which was generated in step 170 and comprises the finite state data and initial state, sets a current position in the encoded opcode stream to be the first encoded opcode in the encoded opcode stream and sets a current state to be the initial state, which in this example is 0. The following is the current state of the new target processor in the encoded opcode stream in this example: [^2, 2, 1, . . . ].

In step 320, the finite state machine determines the encoded opcode at a current position in the encoded opcode stream to be the current encoded opcode. For example, the new target processor determines the current encoded opcode is 2.

In step 330, the finite state machine determines a decoded opcode based on the finite state data, the current state, and the current encoded opcode. Continuing with the current example, the new target processor determines that 0 is the decoded opcode based on the finite state data, the current state (0), and the current encoded opcode (2).

In step 340, the finite state machine determines a next state for the finite state machine based on the finite state data, the current state, and the current encoded opcode or decoded opcode. Continuing with the current example, the new target processor selects 1 as the next state for the new target processor based on the current state (0) and the current encoded opcode (2) or decoded opcode (0).

In step 350, the finite state machine replaces the current encoded opcode with the decoded opcode at the current position in the encoded opcode stream. Continuing with the current example, the new target processor replaces the current encoded opcode (2) with the determined opcode (0) at the current position in the encoded opcode stream, which corresponds to the encoded opcode in Line 1 of Snippet 5. The following is the current state of the new target processor in the encoded opcode stream in this example: [^0, 2, 1, . . . ].

In step 360, the finite state machine determines whether the current position is at the end of the encoded opcode stream. If so, the finite state machine may proceed to step 390; otherwise, the finite state machine may proceed to step 370. Continuing with the current example, the new target processor determines that the current position is not at the end of the encoded opcode stream. In response, the new target processor proceeds to step 370.

In step 370, the finite state machine updates the current state with the determined next state, and updates the current position in the opcode stream. For example, the new target processor updates the current state to 1, which is the current value of the next state. The new target processor also increments the current position in the encoded opcode stream by one and revisits step 320. The following is the current state of the new target processor in the encoded opcode stream: [0, ^2, 1, . . . ].

In revisited step 320, the new target processor determines the current encoded opcode is 2 based on the current position in the encoded opcode stream.

In revisited step 330, the new target processor determines that 1 is the decoded opcode based on the finite state data, the current state (1), and the current encoded opcode (2).

In revisited step 340, the new target processor determines that the next state is 0 based on the finite state data, the current state (1), and the current encoded opcode (2) or the decoded opcode (1).

In revisited step 350, the new target processor replaces the current encoded opcode (2) with the determined decoded opcode (1) at the current position in the opcode stream, which corresponds to the opcode in Line 2 of Snippet 5. The following is the current state of the new target processor in the encoded opcode stream in this example: [0, ^1, 1, . . . ].

In revisited step 360, the new target processor determines that the current position in the encoded opcode stream is not at the end of the opcode stream. In response, the new target processor revisits step 370.

In revisited step 370, the new target processor updates the current state to 0, which is the current value of the next state. The new target processor also increments the current position in the opcode stream by one and revisits step 320. The following is the current state of the new target processor in the encoded opcode stream in this example: [0, 1, ^1, . . . ].

The new target processor repeats step 320 through step 360 until the current position of the new target processor is at the end of the encoded opcode stream, in which case the new target processor proceeds to step 390. In the current example, the encoded opcode stream is now the following decoded opcode stream: [0, 1, 2, . . . ].

In step 390, the finite state machine is done decoding the encoded opcode stream. The processor can execute the decoded opcodes. Additionally, or alternatively, the processor may replace the encoded opcodes in the new encoded set of code with the decoded opcodes in the decoded opcode stream. Continuing with the current example, the new target processor replaces the encoded opcodes in the encoded set of code from step 310 with the decoded opcodes from the decoded opcode stream. In this example, the new target processor produces a new decoded set of code from the encoded set of code generated by the compiler with the same finite state data, which may include an initial state. The new target processor can execute the new decoded set of code with the decoded opcodes.

4.4.1 in-Place Execution of an Encoded Opcode Stream

If the new target processor decodes the new encoded set of code and generates the decoded set of code, then the decoded set of code may be stored in volatile or non-volatile memory or storage. Storing the decoded set of code in volatile or non-volatile storage may provide an attacker an opportunity to get a copy of the decoded set of code.

A processor may be configured to decode an encoded opcode in an encoded opcode stream and execute the decoded opcode without replacing the encoded opcode with the decoded opcode. Each opcode in an opcode stream may be associated with a list or set of parameters. Each list or set of parameters may comprise zero, one, two, or more parameters. A set of comma-separated values enclosed in angle brackets, such as the following, may represent a list or set of parameters for a particular encoded or decoded opcode in an opcode stream: [20, 21 < >, 22 <A>, 23 <B, C>, 23 <B, D>, . . . ]. In the opcode stream, the first opcode (20) is associated with a first operation that need not have any parameters. The second opcode (21) is associated with a second operation that need not have any parameters. The third opcode (22) is associated with a third operation that may have one parameter, and in this example the parameter value is A. The fourth opcode (23) is associated with a fourth operation that may have two parameters, and in this example the first parameter value is B and the second parameter value is C. The fifth opcode (23) is the same as the fourth opcode, and therefore is associated with the fourth operation. However, the values of the parameters passed to the fourth operation in response to processing the fifth opcode will be B and D, rather than B and C.

In one or more of the examples discussed herein with regard to FIG. 2, the compiler processed an opcode stream generated from a set of code that starts with the code in Snippet 5. The opcode stream may be the set of code, which comprises the code in Snippet 5. Accordingly, the opcode stream may be the following opcode stream:

[0 <A, B>, 1 <D, E>, 2 <C>, . . . ].

The encoded opcode stream may therefore be the following encoded opcode stream:

[2 <A, B>, 2 <D, E>, 1 <C>, . . . ].

In step 350, the processor may execute the decoded opcode that corresponds with the current encoded opcode based on any parameters associated with the encoded opcode. For purposes of illustrating a clear example, assume the following:

The new target processor discussed in one or more examples herein with regard to FIG. 3 comprises the finite state machine discussed in one or more examples herein with regard to FIG. 3;

The new target processor and encoded opcode stream are in the following state:

[^2 <A, B>, 2 <D, E>, 1 <C>, . . . ].

The new target processor may execute the operation associated with the decoded opcode, which in this example is 0, based on the set of parameters associated with the current encoded opcode, which in this example is A and B. Also for example, in revisited step 350, if the new target processor and opcode stream are in this state—[2 <A, B>, ^2 <D, E>, 1 <C>, . . . ] and the decoded opcode is 1, then the new target processor may execute the operation associated with decoded opcode 1 based on the set of parameters associated with encoded opcode 2.

4.4.2 Branching During in-Place Execution of an Encoded Opcode Stream

Using a finite state machine according to one or more examples discussed herein to encode a particular opcode in an opcode stream may be based on the next state value determined from a previous opcode in the opcode stream. For purposes of illustrating a clear example, in a previous example's revisited step 230, the compiler and the opcode stream were in the following state: [2 <A, B>, ^1 <D, E>, 2 <C>, . . . ]. The compiler determined that 2 is the encoded opcode based on the current state, but the current state was determined when the compiler had a different position in the opcode stream.

If the new target processor has a first current state while the current position is at a particular encoded opcode, which was generated based on a particular opcode and a second state that is different than the first state, then the target processor may incorrectly decode the particular encoded opcode. For purposes of illustrating a clear example, assume the following:

A compiler processes the following opcode stream:
[0 <A, B>, 1 <D, E>, 2 <4>, 0 <D, F>, 2 <G>, . . . ];

The operation associated with opcode 2 is a position-changing operation, such as jump, branch, or other operation that will cause a processor to move the current position to another position in the opcode stream.

The operation associated with opcode 2 will cause the new target processor to move the current position based on the associated parameter, which is a zero-based index with the value 4 in this example;

The compiler and a new target processor are state machines using the state data illustrated in Table 3;

The compiler generates the following encoded opcode stream using one or more of the methods discussed herein:
[2 <A, B>, 2 <D, E>, 1<4>, 1 <D, F>, 1 <G>, . . . ];

The new target processor is in the following state:
[2 <A, B>, 2 <D, E>, ^1 <4>, 1 <D, F>, 1 <G>, . . . ];

The new target processor determines the decoded opcode is 2 and the next state is 1.

The new target processor executes the position-changing operation based on the zero-based index 4, and the target processor moves the current position to the fifth position in the encoded opcode stream. Accordingly, the current state is now 1, and the new target processor and the encoded opcode stream are in the following particular state: [2 <A, B>, 2 <D, E>, 1<4>, 1 <D, F>, ^1 <G>, . . . ]. The new target processor would therefore incorrectly determine that the decoded opcode is 0. However, if the new target processor had decoded the encoded opcode stream sequentially, like the compiler, then the current state would have been 0 when the new target processor and the encoded opcode stream were in this particular state. The new target processor would therefore have correctly determined that the decode opcode is 2.

4.4.3 Synchronizing Current State Between a Target Processor and Compiler

An opcode associated with a position-changing operation may be referred to herein as a position-changing opcode. A position-changing operation may cause a processor to jump to a new position in an opcode stream. The new position may be referred to as a destination position. A compiler or processor may determine the destination position for a position-changing opcode based on the position-changing opcode or a parameter associated with the position-changing opcode.

If a compiler identifies a position-changing opcode in a opcode stream, then the compiler may insert one or more next-state-specific opcodes into the opcode stream at the destination position in the opcode stream. A next-state-specific opcode is an opcode that is associated with only a particular next state in the finite state data, although other opcodes may be associated with more than one next state. For example, a compiler may assign the initial state to the next state associated with a next-state-specific opcode in the finite state data. If the compiler determines that an opcode at a destination position is already a next-state-specific opcode, then the compiler need not insert another next-state-specific opcode into the opcode stream at the destination position.

For purposes of illustrating a clear example of inserting a next-state specific opcode at a destination position, assume the following:

A compiler is processing the following opcode stream:
[0 <A, B>, 1 <D, E>, 2 <450>, 0 <D, F>, 2 <G>, . . . ];

The compiler and the opcode stream are in the following state:
[2 <A, B>, 2 <D, E>, ^2 <450>, 0 <D, F>, 2 <G>, . . . ];

2 is a position changing opcode that will cause the new target processor to move to a particular destination position in the opcode stream based on the parameter associated with the position changing opcode.

The particular destination position is the fifth opcode in the opcode stream;

The compiler and a new target processor are state machines using the state data illustrated in Table 3;

The compiler and the new target processor include finite state data indicating that 9 is a next-state-specific opcode associated with a nop.

The compiler and the new target processor include finite state data indicating that the initial state is assigned to the be the next state for the next-state-specific opcode 9;

The compiler and the new target processor include state data indicating that the opcode 9 does not map to an encoded opcode;

The opcode stream is a linked list.

Figure 4A:
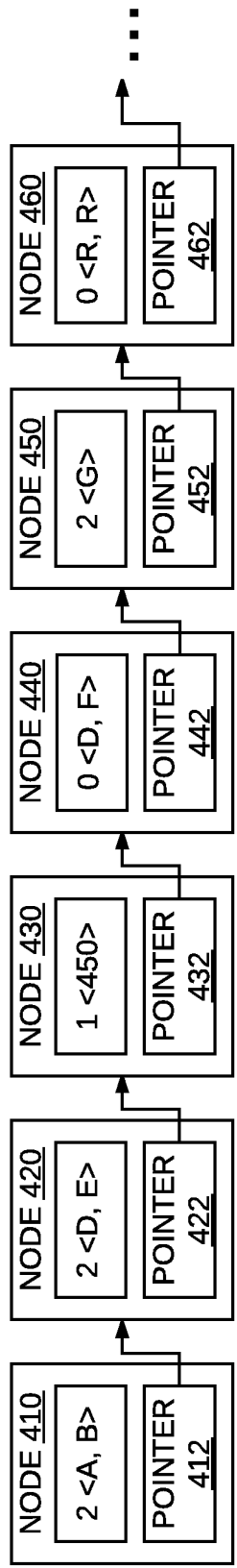
FIG. 4A illustrates an opcode stream that is structured as a linked list in an example embodiment.

FIG. 4A illustrates an opcode stream that is structured as a linked list in an example embodiment. Each opcode in the current example has a corresponding opcode in FIG. 4A. Each node has a pointer to the next node in opcode stream according to the current example. Node 410 has the first opcode and parameters in the current example, and pointer 412, which points to the next node, node 420. Node 420 has the second opcode and parameters in the current example, and pointer 422, which points to the next node, node 430. Node 430 has the second opcode and parameters in the current example, and pointer 432, which points to the next node, node 440. Node 440 has the second opcode and parameters in the current example, and pointer 442, which points to the next node, node 450. Node 450 has the second opcode and parameters in the current example, and pointer 452, which points to the next node, node 460. Node 460 has the second opcode and parameters in the current example, and pointer 462, which points to the next node in the opcode stream.

The compiler determines that the current opcode (2) is a position-changing opcode and the particular destination position, which in this example is the fifth opcode in the opcode stream. The compiler inserts, into the opcode stream, at the particular destination position, a nop opcode. The number of next-state-specific opcodes inserted into the particular destination position may be equal to the distance between current opcode and the opcode that sets the next state that influences the current opcode's encoding, which in this example is one.

Figure 4B:
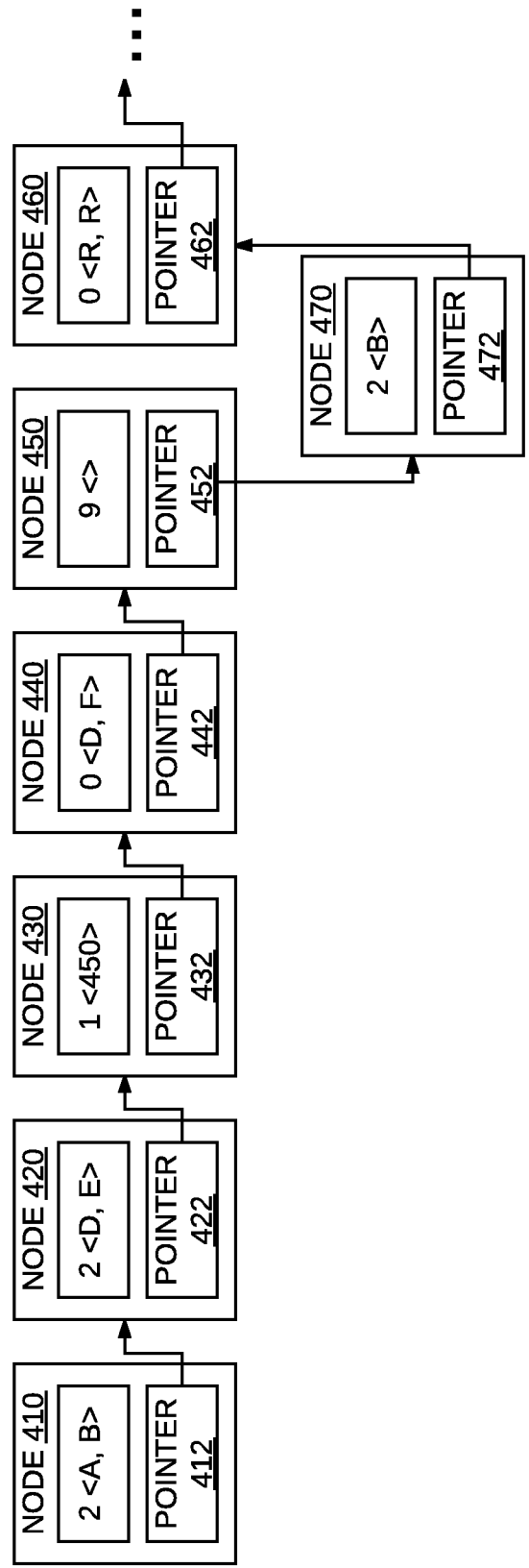
FIG. 4B illustrates a modified opcode stream that is structured as a linked list and has a next-state-specific opcode inserted into a destination position in an example embodiment.

FIG. 4B illustrates a modified opcode stream that is structured as a linked list and has a next-state-specific opcode inserted into a destination position in an example embodiment. In FIG. 4B, the compiler produces node 470, which includes pointer 472, by making a copy of node 450 in FIG. A. Accordingly, node 470 has the same opcode and parameters as node 450 in 4A, and pointer 472 points to node 460. However, as illustrated in FIG. 4B, the compiler replaces the opcode and parameters in node 450 with a next-state-specific opcode, and changes pointer 452 to point to node 470.

After encoding the position-changing opcode, the compiler and the opcode stream may be in the following state:
 [2 <A, B>, 2 <D, E>, 1 <450>, ˆ0 <D, F>, 9 < >, 2 <G>, . . . ].

After the compiler finishes encoding the opcode stream, the following may be the encoded opcode stream:
 [2 <A, B>, 2 <D, E>, 1 <450>, 1 <D, F>, 9 < >, 1 <G>, . . . ].

The new target processor may execute the encoded opcode stream. The encoded opcode stream may, but need not, be structured as a linked list. Continuing with the previous example, the new target processor and the encoded opcode stream may be in the following state:
 [2 <A, B>, 2 <D, E>, ˆ1 <450>, 1 <D, F>, 9 < >, 1 <G>, . . . ].

In response to determining that the decoded opcode is 2, and executing the position-changing operation, the new target processor moves the current position to the destination position. In this example, the destination position is the fifth position in the encoded opcode stream, or node 450 in FIG. 4B, which results in the following state:
 [2 <A, B>, 2 <D, E>, 1 <450>, 1 <D, F>, ˆ9 < >, 1 <G>, . . . ].

The new target processor determines that the current encoded opcode (9) is a nop opcode, and, in response, sets the next state to be the initial state (0). The new target processor updates the current state with the next state (0) and updates the current position. Accordingly, the following is the current state of the new target processor and the encoded opcode stream:
 [2 <A, B>, 2 <D, E>, 1 <450>, 1 <D, F>, 9 < >, ˆ1 <G>, . . . ].

The new target processor may correctly determine that the decoded opcode is 2 based on the current encoded opcode (1) and the current state (0), which resulted from the next state value associated with the nop code that was inserted into the opcode stream by the compiler.

5.0 Merging Sets of Two or More Opcodes

A processor may generate a result by executing a sequence of two or more opcodes from an opcode stream. Determining how the processor generated the result may be easier for a human if the opcodes in the sequence of opcodes are contiguous in an opcode stream. Interleaving separate sequences of opcodes may make determining how a processor generated a result more difficult.

Merging two sequences of opcodes can generate errors. For example, performing an extra add operation before storing a number can cause a processor to store a different number than the processor would have stored without the extra add operation.

5.1 Managing a Stack

A stack is a data structure. Data can be added to or removed from the top of the stack. A stack may be referred to as a First-In-Last-Out queue, or a Last-In-First-Out queue. A stack may be denoted by a comma-separated list of values that begin with a vertical pipe "|". The following is a stack with values A, B, and C:
| A, B, C In this example, A is at the bottom of the stack and C is at the top of the stack. Pushing one or more values onto the stack may mean adding one or more values to the top of the stack. For example, pushing D and E onto the current stack may generate the following stack:
| A, B, C, D, E Popping one or more values from the stack may mean removing one or more values from the top of the stack. For example, popping three values from the current stack may generate the following stack:
| A, B 5.2 Processing an Opcode Sequence Using a Stack A processor may use a stack to store data while executing an opcode sequence. For example, a processor may execute the opcode in Snippet 7 using a stack. The opcodes in Snippet 7 are strings of values, such as PUSH and ADD, but as discussed herein an opcode may comprise one or more numbers or other values.

Snippet 7:
LINE 01: PUSH 1
LINE 02: PUSH 2
LINE 03: ADD
LINE 04: STORE 128

For purposes of illustrating a clear example of a processor using a stack to execute the opcode sequence in Snippet 7, assume the following:

A processor has a stack with an initial state;
The initial state of the stack is empty;
PUSH is an opcode associated with a first operation to push a value onto the stack;
ADD is an opcode associated with a second operation that pops the first two values from the stack, adds the values together, and pushes the result onto the stack;
STORE is an opcode associated with an operation that pops the value from the top of the stack and stores the value in memory, at an address identified with a parameter.

After executing Line 1 in Snippet 7, the processor pushes 1 onto the stack. The following is the current state of the stack:
| 1.

After executing Line 2 in Snippet 7, the processor pushes 2 onto the stack. The following is the current state of the stack:

| 1, 2.

After executing Line 3 in Snippet 7, the processor pops the top two values from the stack, which in this example are 1 and 2. The processor adds the values together and pushes the result on the stack. The following is the current state of the stack:
| 3.

After executing Line 4 in Snippet 7, the processor pops the top value from the stack, which in this example is 3, and stores the value in a segment of memory with address 128. The following is the current state of the stack:
|.

The stack is now back to a state that the stack was in before the processor started to execute the opcode sequence in Snippet 7. This state may be referred to as the initial state.

5.2.1 Example of Merging Two Independent Opcode Sequences

Two opcode sequences may be merged in a way such that the processor produces the correct result for each opcode sequence. Snippet 8 is similar to Snippet 7, but will cause a processor executing Snippet 8 store a different value (7) in memory location 256. Snippet 9 illustrates an example of a first opcode sequence, which is the opcode sequence from Snippet 8, merged into a second opcode sequence, which is the opcode sequence from Snippet 7.

Snippet 8:
LINE 01: PUSH 3
LINE 02: PUSH 4
LINE 03: ADD
LINE 04: STORE 256

Snippet 9:
LINE 01: PUSH 1
LINE 02: PUSH 2
LINE 03: PUSH 3
LINE 04: PUSH 4
LINE 05: ADD
LINE 06: STORE 256
LINE 07: ADD
LINE 08: STORE 128

For purposes of illustrating a clear example of a processor using a stack to execute the two merged opcode sequences in Snippet 9, assume the following:

A processor has a stack with an initial state;
The initial state of the stack is empty;
PUSH, ADD, and STORE are associated with the operations discussed herein.

After the processor executes Lines 1-4 in Snippet 9, the following is the current state of the stack:
| 1, 2, 3, 4.

After the processor executes Line 5 in Snippet 9, the following is the current state of the stack:
| 1, 2, 7.

After the processor executes Line 6 in Snippet 9, the following is the current state of the stack, and 7 is stored into a segment of memory with address 256:
| 1, 2.

After the processor executes Line 7 in Snippet 9, the following is the current state of the stack:
| 3.

After the processor executes Line 8 in Snippet 9, the following is the current state of the stack, and 3 is stored into a segment of memory with address 128:
|.

Although the second opcode sequence was inserted into the first opcode sequence, the processor stored the same results into the same places in memory, as if the processor executed the second opcode sequence and then the first opcode sequence.

5.3 Independent Opcode Sequences

In the example above, the first opcode sequence and the second opcode sequence are each independent opcode sequences. If the first opcode sequence or the second opcode sequence is not independent, then a processor executing a first opcode sequence inserted into a second opcode sequence may produce a different result than the processor would have produced if the processor executed the first opcode sequence and the second opcode sequence separately. Executing two opcode sequences separately may mean executing one opcode sequence of the two opcode sequences and then the other opcode sequence.

An independent opcode sequence may have one or more of the following attributes:

Does not contain a position-changing opcode;
Does not include a target position of a position-changing opcode; and
The initial stack state is the same as the final stack state.

A position-changing opcode in an opcode stream is an opcode associated with an operation that causes the processor to jump to a new position in the opcode stream that is not the next sequential position in the opcode stream. The new position may be referred to as the target position. The initial stack state is the state of the stack before the first opcode in the opcode sequence is executed. The final stack state is the state of the stack after the last opcode in the opcode sequence is executed.

5.4 Example Process for Merging Independent Opcode Sequences in an Opcode Block A compiler may traverse an opcode stream to identify opcode blocks in the opcode stream. The compiler may identify one or more independent opcode sequences, if any, in each block. For each opcode block with a set of independent opcode sequences comprising two or more independent opcode sequences, the compiler may merge two or more independent sequences in the set of independent opcode sequences. FIG. 5 illustrates a process for merging two independent opcode sequences, in a opcode block, within an opcode stream, in an example embodiment.

5.4.1 Identifying Opcode Blocks in an Opcode Stream

In step 510, the process identifies one or more opcode blocks within an opcode stream. An opcode block is an opcode sequence that does not include a position-changing opcode or a target position. For purposes of illustrating a clear example, assume the following:

A compiler and an opcode stream are in the following state:

["PUSH <1>, PUSH <2>, ADD, STORE X,
PUSH <3>, PUSH <4>, ADD, STORE Z,
PUSH <5>, ... , JUMP <9>, ...];

JUMP is a position-changing opcode;
JUMP <9> is the thirtieth opcode in the opcode stream;
JUMP <9> identifies the ninth opcode in the opcode stream as a target position;
The opcode stream does not include any other position-changing opcodes.

The compiler inspects each opcode in the opcode stream and determines that JUMP <9> is a position-changing opcode, JUMP <9> is in the thirtieth position in the opcode stream, and the target position is the ninth position in the opcode stream. Accordingly, the compiler identifies a first opcode block that spans from the first position to the eighth position in the opcode stream, a second opcode block that spans from the tenth position to the twenty-ninth position in the opcode stream, and a third opcode block that spans from the thirty-first position to the last position in the opcode stream.

5.4.2 Identifying Independent Opcode Sequences in an Opcode Block

In step 520, the process selects an opcode block from the one or more opcode blocks. Continuing with current example, in step 520, the compiler may select the first opcode block, which spans from the first opcode to the eighth position.

In step 530, the process finds one or more independent opcode sequences, if any, in the opcode block. As discussed herein, a process may determine that an opcode sequence in an opcode block is independent by determining the initial stack size is the same as the final stack size, without any opcode in the opcode sequence causing the stack size to go below the initial stack size.

Figure 6:
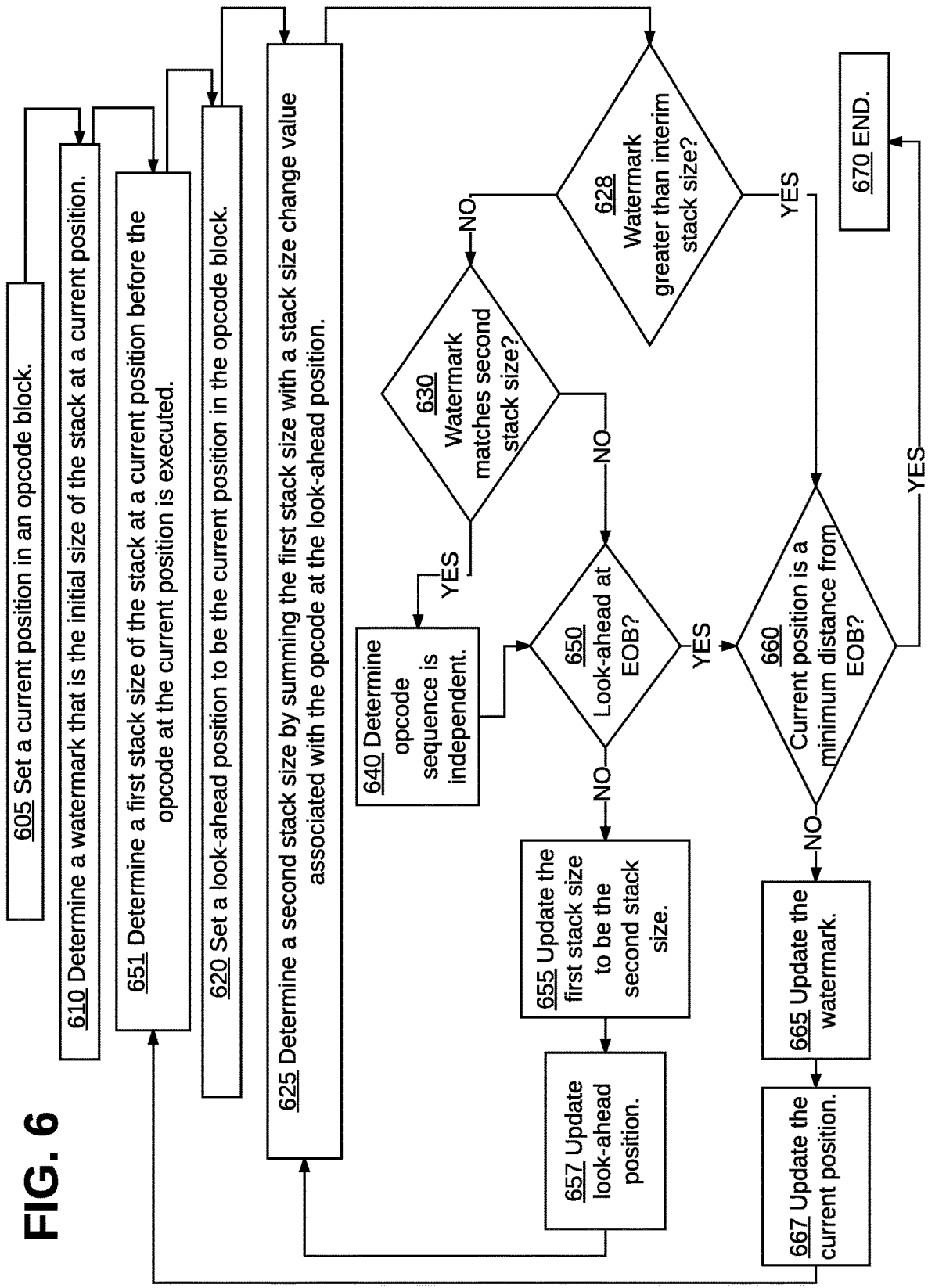
FIG. 6 illustrates a process for identifying one or more independent opcode sequences, if any, within an opcode block in an example embodiment.

FIG. 6 illustrates a process for identifying one or more independent opcode sequences, if any, within an opcode block in an example embodiment. For purposes of illustrating a clear example, assume the following:

The compiler found the opcode blocks in the previous example;
For each opcode in the opcode block, the compiler knows how much the size of a stack managed by a processor will change after executing the opcode, referred to herein as a final stack change, as illustrated in Table 4;
For each opcode in the opcode block, the compiler knows the maximum number of values that were already pushed onto the stack before execution of the opcode, and that will be popped from a stack during execution of the opcode. This value may be referred to as a floor or a maximum interim stack pop, as illustrated in Table 4;
The initial size of the stack is zero.

TABLE 4

|  | Floor | Final Stack Change |
| --- | --- | --- |
| PUSH | 0 | 1 |
| ADD | -2 | -1 |
| STORE | -1 | -1 |

Table 4 includes three opcodes: PUSH, ADD, STORE. Each opcode is associated with a floor and a final stack size change value. For example, a processor that executes the PUSH opcode will not decrease the size of the stack during execution of the PUSH opcode, and therefore, the floor associated with the PUSH opcode is zero. When the processor finishes executing the PUSH opcode, then the stack will have increased by one, and therefore, the final stack change is one. The processor executing the ADD opcode will decrease the size of the stack by two, at most, during execution of the ADD opcode, and therefore, the floor associated with the ADD opcode is -2. Before the processor finishes executing the ADD opcode, the processor will push the computed sum onto the stack, and therefore, the final stack change for the ADD opcode is -1. The processor executing the STORE opcode will decrease the size of the stack by one during execution of the STORE opcode, and therefore, the floor associated with the STORE opcode is -1. The processor will not push or pop any other values from the stack, and therefore, the final stack change for the ADD opcode is -1.

In step 605, the process sets a current position in an opcode block. Continuing with the current example, the compiler may set the current position to be the first opcode in the first opcode block. Accordingly, the compiler and the first opcode block are in the following state:

["PUSH <1>, PUSH <2>, ADD, STORE X,
PUSH <3>, PUSH <4>, ADD, STORE Z].

In step 610, the process determines a watermark that is the initial size of the stack at a current position. Continuing with the current example, the compiler determines that the watermark is zero because the initial size of the stack is zero.

In step 651, the process determines a first stack size of the stack at a current position before the opcode at the current position is executed. Continuing with the current example, the compiler determines that a first stack size is zero because the watermark is zero.

In step 620, the process sets a look-ahead position to be the current position in the opcode block. Continuing with the current example, the compiler sets a look-ahead position to be in the same position as the current position. For purposes of illustrating a clear example, an asterisk (*) will indicate the position of a look-ahead position in an opcode block. Accordingly, the following indicates that the compiler has a current position and a look-ahead position that are both in the first position within the opcode block:

["*PUSH <1>, *PUSH <2>, ADD, STORE X,
PUSH <3>, PUSH <4>, ADD, STORE Z].

In step 625, the process determines a second stack size by summing the first stack size with a stack size change value associated with the opcode at the look-ahead position. Continuing with the current example, the compiler determines the second stack size to be one, because the first stack size is zero and the stack size change value associated with the opcode at the look-ahead position (PUSH) is one.

In step 628, the process determines whether the watermark is greater than an interim stack size. If not, then the process proceeds to step 630; otherwise, the process proceeds to step 660. A process determines an interim stack size by summing the first stack size with the floor associated with the opcode at the current look-ahead position. Continuing with the current example, the compiler determines an interim stack size to be zero, because the first stack size is zero and the floor associated with the opcode at the look-ahead position (PUSH) is zero. The compiler determines the watermark (zero) is not greater than the interim stack size (zero), and in response, proceeds to step 650.

In step 630, the process determines whether the watermark matches the second stack size. If not, then the process proceeds to step 650; otherwise, the process proceeds to step 640. Continuing with the current example, the compiler determines the watermark does not match the second stack size, because the watermark is zero and the second stack size is one. In response, the compiler proceeds to step 650.

In step 650, the process determines whether the look-ahead position is at the end of the opcode block ("EOB"). If not, then the process proceeds to step 655; otherwise, the process proceeds to step 660. Continuing with the current example, the compiler determines that the look-ahead position is not at the end of the opcode block, and proceeds to step 655.

In step 655, the process updates the first stack size to be the second stack size. Continuing with the current example, the compiler sets the first stack size to be one because the second stack size is currently one.

In step 657, the process updates the look-ahead position in the opcode block. Continuing with the current example, the compiler moves the look-ahead position to the next position in the opcode block. The compiler and the current opcode block are in the following state:

["PUSH <1>, *PUSH <2>, ADD, STORE X,
PUSH <3>, PUSH <4>, ADD, STORE Z].

The compiler may repeat one or more steps discussed above until the watermark is greater than an interim stack size and the compiler proceeds to step 660, the watermark matches the second stack size and proceeds to step 640, or the look-ahead position is at the end of the current opcode block and the compiler proceeds to step 660. For example, in revisited step 625, the compiler determines the second stack size to be two, because the first stack size is one and the stack size change value associated with the opcode at the look-ahead position (PUSH) is one, the sum of which is two. In revisited step 628, the compiler may determine the interim stack size is one, because the first stack size is one and the floor associated with the opcode at the look-ahead position (PUSH) is zero, the sum of which is one. The compiler determines that the watermark is not greater than an interim stack size. In revisited step 630, the compiler determines that the watermark does not match the second stack size because the watermark is zero and the second stack size is two. The compiler performs step 650, step 655, and step 657, and the compiler and current opcode block are in the following state:

["PUSH <1>, PUSH <2>, *ADD, STORE X,
PUSH <3>, PUSH <4>, ADD, STORE Z].

The compiler may repeat one or more of the steps, processes, methods, or systems discussed above or herein, one or more times.

In step 640, the process determines that an opcode sequence is independent. For purposes of illustrating a clear example, assume the following:

The compiler and the current opcode block are in the following state:

["PUSH <1>, PUSH <2>, ADD, *STORE X,
PUSH <3>, PUSH <4>, ADD, STORE Z];

The watermark is zero;
The first stack size is one;
The compiler is at step 625.

In step 625, the compiler determines that the second stack size is zero because the first stack size is one and the stack change value associated with the opcode at the look-ahead position (STORE) is −1. In step 628, the compiler determines that the interim stack size is zero because the first stack size is one and the floor associated with the opcode at the look-ahead position (STORE) is −1. The compiler determines that the watermark is not greater than the interim stack size, and proceeds to step 630. In step 630, the compiler determines that the watermark matches the second stack size, and proceeds to step 640.

In step 640, the process identifies a new independent opcode sequence starting at the current position and ending at the look-ahead position, inclusively. Continuing with the current example, the compiler determines that a first independent opcode sequence is in the current opcode block, which begins at the first position and ends at the fourth position, inclusively.

Figure 7:
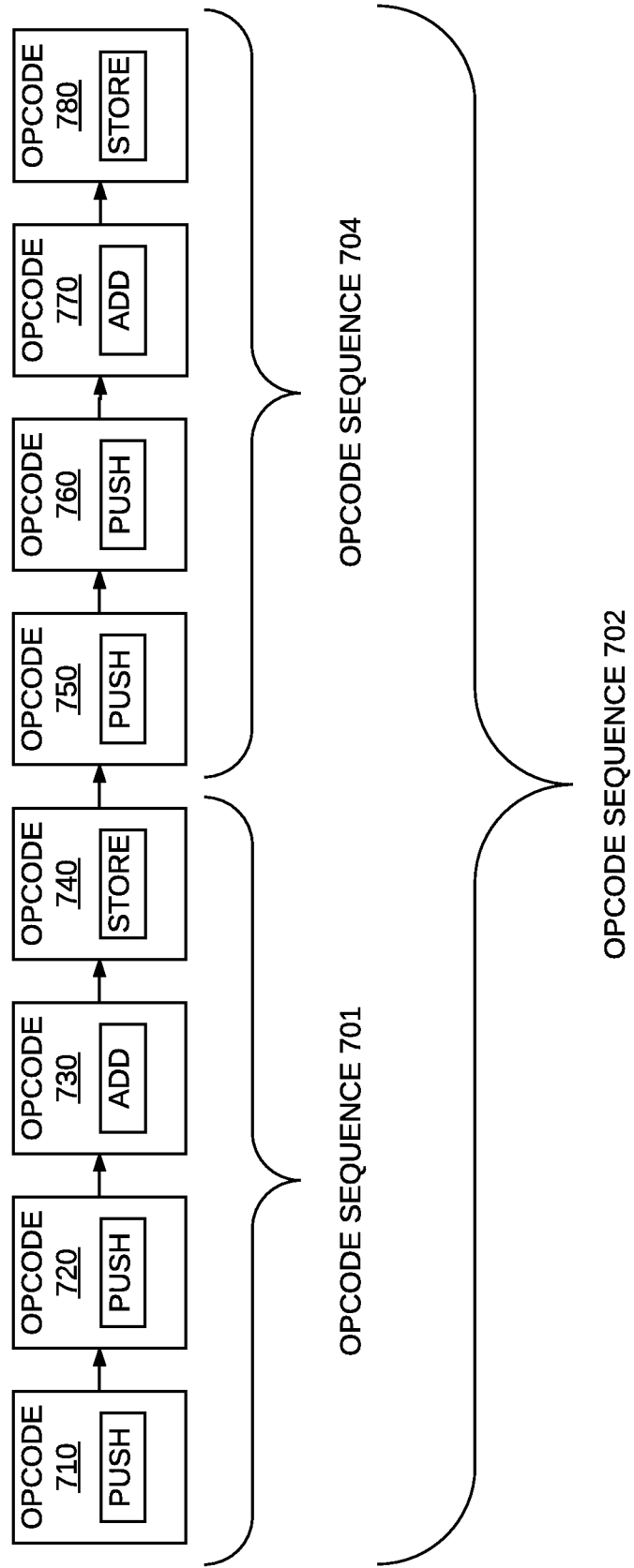
FIG. 7 illustrates an opcode block with a plurality of independent opcode sequences.

FIG. 7 illustrates an opcode block with a plurality of independent opcode sequences. In FIG. 7, opcode block 700 is the opcode block in the current example. Opcode block 700 comprises opcode 710, opcode 720, opcode 730, opcode 740, opcode 750, opcode 760, opcode 770, and opcode 780, each of which corresponds to an opcode in the current example. Opcode sequence 701 is the independent opcode sequence identified in the current example.

5.4.3 Finding Additional Independent Opcode Sequences from the Current Position

Returning now to the process in FIG. 6, and in the current example, the compiler proceeds to step 650. In step 650, the compiler determines that the look-ahead position is not at the end of the current opcode block (opcode block 700 in FIG. 7), and proceeds to step 655. After the compiler performs step 655 and step 657, the compiler and the current opcode block have the following state:

["PUSH <1>, PUSH <2>, ADD, STORE X,
*PUSH <3>, PUSH <4>, ADD, STORE Z].

The compiler may repeat one or more of the steps discussed herein, until the compiler proceeds to step 640 or step 660. For purposes of illustrating a clear example, assume the following:

The compiler and the current opcode block are in the following state:

["PUSH <1>, PUSH <2>, ADD, STORE X,
PUSH <3>, PUSH <4>, ADD, *STORE Z];

The watermark is zero;
The interim stack size is zero;
The second stack size is zero.

In step 628, the compiler determines that the watermark is not greater than the interim stack size and proceeds to step 630. In step 630, the compiler determines that the watermark matches the second stack size and proceeds to step 640. In step 640, the compiler determines that a second independent opcode sequence is in the current opcode block, which begins at the first position and ends at the eighth position, inclusively. Opcode sequence 702, in FIG. 7, is the second independent opcode sequence identified in the current example. In step 650, the compiler determines that the look-ahead is at the end of the current opcode block, and in response the compiler proceeds to step 660.

5.4.4 Finding an Independent Opcode Sequence from a New Position

In step 660, the process determines whether the current position is a minimum distance from the end of the current opcode block. If not, then the process proceeds to step 665; otherwise, the process proceeds to step 670. A minimum distance may be zero or more. For purposes of illustrating a clear example, assume the minimum distance is one. Accordingly, the compiler determines that the current position is in the first position in the opcode block, which is not one opcode from the end of the current opcode block, and proceeds to step 665.

In step 665, the process updates the watermark. Continuing with the current example, the compiler determines the stack size change value associated with the current opcode at the current position, which in this example is one, and adds the stack size change value associated with the current opcode to the watermark to determine the watermark for the next opcode in the opcode block. In an embodiment, the watermark need not change. The watermark may be a constant value, such as zero.

In step 667, the process updates the current position to be the next position in the current opcode block. Continuing with the previous example, the compiler may update the current position to the second position in the current opcode block.

In step 651, the compiler determines the first stack size at the current position. The compiler may determine that the first stack size to be the same as the watermark. In step 620, the compiler sets the look-ahead position to be the current position. Accordingly, in the current example, the watermark is one, the first stack size is one, and the following is the present state of the compiler and the current opcode block:

[PUSH <1>^PUSH <2>, *ADD, STORE X,
PUSH <3>, PUSH <4>, ADD, STORE Z].

The compiler may continue to process the current opcode block using one or more of the steps, processes, methods, or systems discussed above or herein. In this example, the compiler may have a watermark of one, the first stack size may be one, the second stack size may be one, and the compiler may be in the following state with the current opcode block: [PUSH <1>, {circumflex over ()}*PUSH<2>, ADD, STORE X, PUSH<3>, PUSH<4>, ADD, STORE Z].

Based on the foregoing, in step 628, the compiler may determine that the interim stack size is zero, and that the watermark is greater than the interim stack size. In response, the compiler will proceed to step 660. The compiler may execute step 660, step 665, step 667, step 651, step 620, at which point the compiler may be in the following state with the current opcode block: [PUSH<1≤, PUSH<2>, {circumflex over ()}*Add, Store X, PUSH<3>, PUSH<4>, ADD, STORE Z].

Using one or more of the steps, processes, methods, or systems discussed above or herein discussed herein, in the current example, the compiler may identify opcode sequence 704, proceed to step 660, and be in the following state with the current opcode block:

[PUSH <1>, PUSH <2>, ADD, STORE X,
PUSH <3>, PUSH <4>, ^ADD, *STORE Z].

In step 660, in the current example, the minimum distance from the end of the opcode block is one, and therefore the compiler determines that the current position is the minimum distance from the end of the current opcode block, and proceeds to step 670.

In step 670, the process may have found the opcode sequences in the current opcode block, and the process may return to step 540 in FIG. 5. Accordingly, the compiler may proceed to step 540.

5.4.5 Finding Two or More Opcode Sequences in an Opcode Block to Merge

In step 540, the process determines whether two or more independent opcode sequences were found in the opcode block. If so, then the process proceeds to step 550; otherwise, the process proceeds to step 560. Continuing with the current example, because the compiler found three independent opcode sequences in the current opcode block, the compiler proceeds to step 550.

In step 550, the process merges the two or more opcode sequences, if possible. During this step, the process may identify a set of opcode sequence pairs. If the set of opcode sequence pairs is empty, then the process may proceed to step 560. If the set of opcode sequence pairs is not empty, then the process may select a particular opcode sequence pair from the set of sequence pairs, and merge the source opcode sequence with the target opcode sequence.

An opcode sequence pair comprises a first independent opcode sequence that can be merged or inserted into a second independent opcode sequence. The first independent opcode sequence may be referred to herein as a source sequence. The second independent opcode sequence may be referred to herein as a target sequence.

A first independent opcode sequence may be merged into a second independent opcode sequence if one or more of the following are true:
  The first independent opcode sequence does not overlap with the second independent opcode sequence;
  The first independent opcode sequence comes before the second independent opcode sequence in the opcode block or opcode stream;
  The second independent opcode sequence comprises at least two opcodes;
  If the first independent opcode sequence includes an effectful opcode, and if a set of one or more opcodes is positioned between the end of the first independent opcode sequence and the beginning of the second independent opcode sequence, then the set of one or more opcodes does not comprise an effectful opcode.

An effectful opcode may be an opcode that causes an effect that is observable to a processor or process that is outside of the processor. For example, an effectful opcode may be an opcode that is associated with an operation that performs a network input/output ("I/O") or a console I/O request. Also for example, an effectful opcode may be an opcode that is associated with an operation in a process that stores a value in volatile or non-volatile memory that another process other than the processor can access, such as a value returned to a process from an interpreter or other processor. For purposes of illustrating a clear example, assume that STORE is designated to be an effectful opcode, but PUSH and ADD are not designated as effectful opcodes. Accordingly, in the current example, opcode 740 and opcode 780 are effectful opcodes in the current opcode block. Opcode 710, opcode 720, opcode 730, opcode 750, opcode 760, and opcode 770 are not effectful opcodes.

Continuing with the current example, the compiler may determine that opcode sequence 702 overlaps with opcode sequence 701 and opcode sequence 704, but opcode sequence 701 does not overlap with opcode sequence 704. The compiler may also determine that no opcodes are between opcode sequence 701 and opcode sequence 704. The compiler may determine that opcode sequence 701 does include an effectful opcode (STORE), but no opcodes between opcode sequence 701 and opcode sequence 704 are effectful, because no opcodes are between opcode sequence 701 and opcode sequence 704.

Although the process may find two or more independent opcode sequences in an opcode block, the process may determine that an independent opcode sequence cannot be safely merged with one or more other independent opcode sequences in the current opcode block. For example, if an effectful opcode was positioned in the current opcode block between opcode 740 and opcode 750, which would be between opcode sequence 701 and opcode sequence 704, then opcode sequence 701 could not be merged with opcode sequence 704.

The process may determine that a particular independent opcode sequence can be merged into more than one other independent opcode sequence. Additionally or alternatively, the process may determine that more than one independent opcode sequence may be merged into a particular independent opcode sequence.

Continuing with the current example, and based on the foregoing, the compiler may identify a set of opcode sequence pairs comprising a single opcode sequence pair. The single opcode sequence pair comprises opcode sequence 701 as the source sequence and opcode sequence 704 as the target sequence.

5.4.6 Selecting a Source-Target Opcode Pair

The process may select an opcode sequence pair from a set of opcode sequence pairs based on one or more metrics or conditions. In the current example, the set of opcode sequence pairs comprises a single opcode sequence pair, so the compiler may select the single opcode sequence pair. However, if the set of opcode sequence pairs is more than one opcode sequence pair, then the compiler may select, from the set of opcode sequence pairs, the opcode sequence pair with the longest total length. In an embodiment, the total length of an opcode sequence pair is the number of opcodes in the source opcode sequence and the number of opcodes in the target opcode sequence. In an embodiment, the total length of an opcode sequence pair may be the number of opcodes in the source opcode sequence, the number of opcodes in the target opcode sequence, and the number of opcodes between the source opcode sequence and the target opcode sequence, if any.

5.4.7 Merging a Source-Target Opcode Pair

The process may merge a source opcode sequence with a target opcode sequence based on one or more metrics or conditions. In an embodiment, the process may identify a middle opcode in the target opcode sequence and insert the source opcode sequence before the middle opcode in the target opcode sequence. If a target opcode sequence comprises an effectful opcode, then the process may determine that the middle opcode is the first effectful opcode in the target opcode sequence. Otherwise, the process may determine that the last opcode in the target opcode sequence is the middle opcode.

Figure 8:
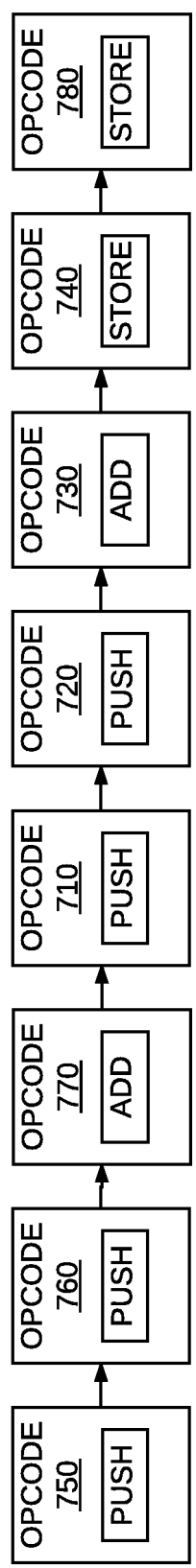
FIG. 8 illustrates an opcode block after a first opcode sequence has been merged into a second opcode sequence.

In the current example, the compiler may determine that opcode 780 is the middle opcode in opcode sequence 704 because opcode 780 is the first effectful opcode in opcode sequence 704. The compiler may insert opcode sequence 701 into opcode sequence 704 between opcode 770 and opcode 780. FIG. 8 illustrates an opcode block after a first opcode sequence has been merged into a second opcode sequence. In FIG. 8, opcode block 800 is the result of inserting opcode sequence 701 into opcode sequence 704 in the current example.

The process may repeat step 550 one or more times, or proceed to step 560. In the current example, the compiler may repeat step 550 by performing one or more of the steps, processes, methods, or systems discussed above or herein to find a set of opcode sequence pairs for opcode block 800. The compiler may determine that the set of opcode sequence pairs for opcode block 800 is empty, and proceed to step 560. Although the compiler could continue to find a set of opcode sequence pairs that was not empty for an opcode block, the compiler may impose a limit on the number of times that the compiler will repeat step 550.

5.4.8 Merging Opcode Sequences in Other Opcode Blocks

In step 560, the process determines whether the current opcode block is the last opcode block in the opcode stream. If not, then the process may proceed to step 570; otherwise, the process may proceed to step 580. Continuing with the current example, the compiler may determine that the current opcode block is not the last opcode block in the opcode stream, and the compiler may proceed to step 570.

In step 570, the compiler may select a new opcode block from the one or more opcode blocks in the opcode stream. In the current example, the compiler may select the second opcode block, which spans from the tenth position to the twenty-ninth position in the opcode stream, and proceed to step 530. The compiler may repeat one or more of the steps, processes, methods, or systems discussed above or herein until the compiler returns to step 560 after processing the last block in the opcode stream, and proceed to step 580.

In an embodiment, in step 520 or step 570, the compiler may skip one or more of the steps discussed herein for an opcode block that does not satisfy one or more conditions. For example, in step 520, if the first opcode block does not include at least a particular number of opcodes, then the compiler may proceed to step 560. Also for example, in step 570, if the next opcode block does not include a particular number of opcodes, then the compiler may return to step 560.

In step 580, the process ends. For example, the compiler may store the opcode stream, which may have one or more opcode blocks that were modified based on one or more of the steps, processes, methods, or systems discussed above or herein, as a new set of code.

The original set of code, from which the compiler received the original opcode stream, may be different than the new set of code produced from merging independent opcode sequences. However, the new set of code may functionally equivalent to the original set of code. If a processor can process the original set of code and the new set of code is generated by merging independent opcode sequences, then the processor can process the new set of code. The compiler need not generate a new target processor to process the new set of code. However, if the compiler uses one or more other steps, processes, methods, or systems discussed above or herein to generate a new set of code from an original set of code, then the new set of code may not be functionality equivalent to the original set of code without a new target processor.

6.0 Using a Compiler to Obfuscate Code that a Server Sends to a Client Computer

A web page can comprise code, such as JavaScript, that is sent to a browser on a client computer. The browser can execute the code to create or modify the web page. Code written in some programming languages, like JavaScript, can be easier to read than code written in other languages. Some malicious users may read the code in a web page to determine how to bypass one or more security measures. To deter a malicious user from understanding what the code does in a web page, a server computer can obfuscate the code.

6.1 Network Topology

FIG. 9 illustrates a computer system comprising a server computer that can compile an original set of code for a particular type of processor into one or more new sets of code and corresponding interpreters, and send each new set of code with a new version of an interpreter to a different client computer, in an example embodiment. In FIG. 9, server computer 910 is operably coupled with client computer 940 and client computer 960 over one or more interconnected computer networks.

Server computer 910 comprises hardware processor 912, compiler 920, and code 922, which comprises code 924. Code 922 may comprise JavaScript code or code in one or more other languages or instruction sets. Code 924 may be a subset of, referenced by, or added to code 922. Code 922 and code 924 may be stored on, or distributed by, different computers on different computer networks. Code 922 or code 924 may be receive from one or more client computers or server computers not illustrated in FIG. 9.

Client computer 940 comprises hardware processor 942 executing browser 944 and JavaScript interpreter 946. A JavaScript interpreter, such as JavaScript Interpreter 946 may also be referred to as a JavaScript engine or runtime environment. A JavaScript interpreter can execute code written in JavaScript. The JavaScript interpreter executes the code by transforming or compiling the JavaScript code into code that the underlying processor executes. In some browsers, the underlying processor for a JavaScript interpreter is a Java interpreter; the underlying processor for a Java interpreter may be one or more hardware processors.

Client computer 960 comprises hardware processor 962 executing browser 964 and JavaScript interpreter 966. Hardware processor 962 may be a different type of processor and have a different instruction set than hardware processor 942. Accordingly, JavaScript interpreter 966 and JavaScript 946 may be different—or may be executed by one or more different types of—processors or interpreters. However, JavaScript interpreter 966 may be the same type of processor, or have the same instruction set, as JavaScript interpreter 946.

Figure 10:
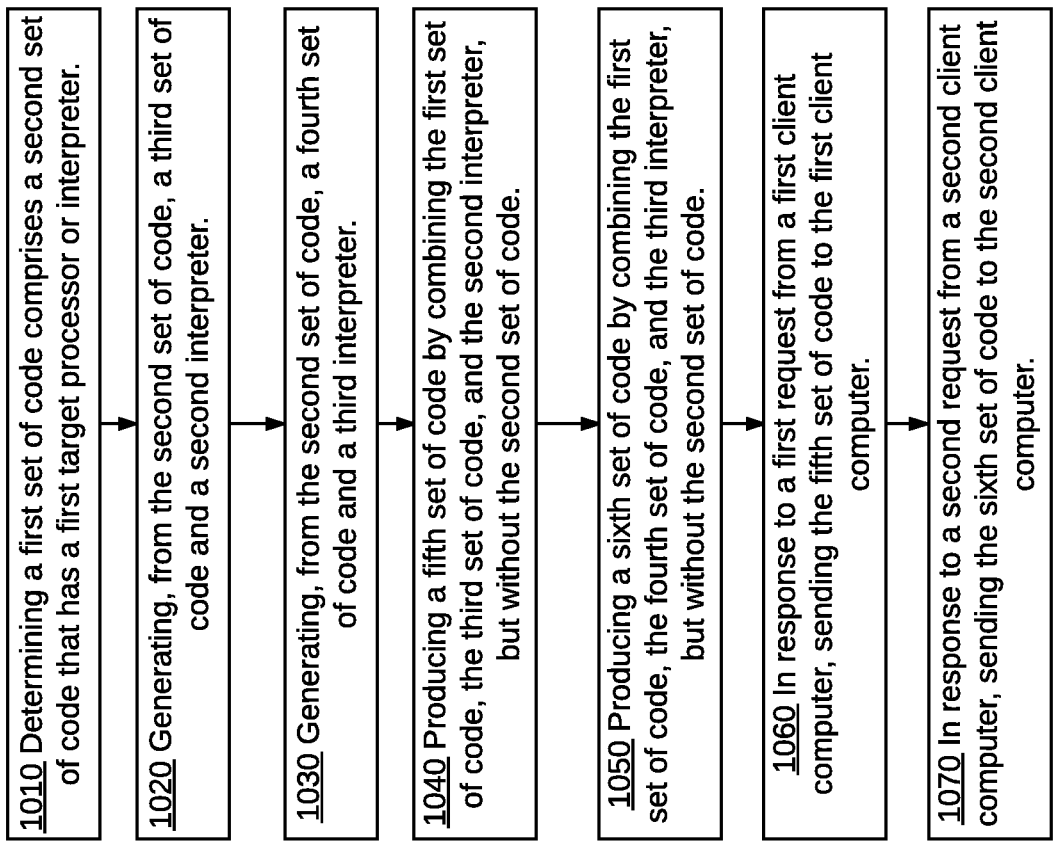
FIG. 10 illustrates a process for generating different compiled versions of a set of code with different corresponding interpreters according to an example embodiment.

6.2 Systems and Method for Obfuscating Code Sent to One or More Client Computers FIG. 10 illustrates a process for generating different compiled versions of a set of code with different corresponding interpreters according to an example embodiment. In step 1010, a server computer determines that a first set of code comprises a second set of code that has a first target processor or interpreter. For purposes of illustrating a clear example, code 922 is a set of code that comprises a web page, or a portion of a web page, and server computer 910 receives a request for code 922 or code 924 from browser 944 on client computer 940. Server computer 910 also receives a request from browser 964 on client computer 960 for code 922 or code 924. Server computer 910 may determine that code 922 comprises code 924. Additionally or alternatively, in response to a request for code 922 or code 924 from a browser or client computer, server computer 910 may be configured to determine that code 924 should be obfuscated according to one or more protocols or processes discussed herein. Server computer 190 may, but need not, determine that code 922 comprises code 924 in response to a request for code 924.

In step 1020, the server computer generates, from the second set of code, a third set of code and a second interpreter. For example, compiler 920 may generate code 934 by modifying one or more opcodes in code 924 using one or more of the steps, processes, methods, or systems discussed above or herein. Compiler 920 may also generate interpreter 932 using one or more of the steps discussed herein. Interpreter 932 may be a new target processor configured to execute code 934. Interpreter 932 may be a different type of processor than JavaScript interpreter 946 and hardware processor 942. Interpreter 932 may be configured to be executed by JavaScript interpreter 946. Interpreter 932 and code 934 may be functionally equivalent to code 924 if executed by JavaScript interpreter 946.

In step 1030, the server computer generates, from the second set of code, a fourth set of code and a third interpreter. For example, compiler 920 may generate code 954 by modifying one or more opcodes in code 924 using one or more of the steps, processes, methods, or systems discussed above or herein. Compiler 920 may also generate interpreter 952 using one or more of the steps discussed herein. Interpreter 952 may be a new target processor configured to execute code 954. Interpreter 952 may be a different type of processor than JavaScript interpreter 966 and hardware processor 962. Interpreter 952 may be configured to be executed by JavaScript interpreter 966. Interpreter 952 and code 954 may be functionally equivalent to code 924 if executed by JavaScript interpreter 966.

In step 1040, the server computer produces a fifth set of code by combining the first set of code, the third set of code, and the second interpreter, but without the second set of code. For example, compiler 920 may replace a reference to code 924 in code 922 with a reference to code 934 or interpreter 932. In an embodiment, code 934 and interpreter 932 may replace code 924 in code 922.

In step 1050, the server computer produces a sixth set of code by combining the first set of code, the fourth set of code, and the third interpreter, but without the second set of code. For example, compiler 920 may replace a reference to code 924 in code 922 with a reference to code 954 or interpreter 952. In an embodiment, code 954 and interpreter 952 may replace code 924 in code 922.

In step 1060, the server computer, in response to a first request from a first client computer, sends the fifth set of code to the first client computer. For example, the server computer may send code 922, code 934, or interpreter 932 to browser 944. JavaScript interpreter 946 may execute interpreter 932, which executes code 934, causing JavaScript interpreter 946 to generate the same output or perform the same steps had JavaScript interpreter 946 received code 924.

In step 1070, the server computer, in response to a second request from a second client computer, sends the sixth set of code to the second client computer. For example, the server computer may send code 922, code 954, or interpreter 952 to browser 964. JavaScript interpreter 966 may execute interpreter 952, which executes code 954, causing JavaScript interpreter 966 to generate the same output or perform the same steps had JavaScript interpreter 966 received code 924.

Interpreter 932 may be a different type of processor than interpreter 952, and code 954 may comprise one or more opcodes that are different from the opcodes in code 934. Code 934 may comprise one or more opcodes that are different than the opcodes in code 954. For example, compiler 920 may produce interpreter 932 and code 934 using a first set of numbers from a pseudorandom number generator, and using one or more opcode shuffling or opcode encoding/decoding steps, processes, methods, or systems discussed above or herein. Compiler 920 may produce interpreter 952 and code 954 using a second set of numbers from the pseudorandom number generator, and using one or more opcode shuffling or opcode encoding/decoding steps, processes, methods, or systems discussed above or herein. Compiler 920 may map a first opcode to a particular function in interpreter 932 and a second opcode to the particular function in interpreter 952. The first opcode may be different than the second opcode. Code 954 need not include the first opcode and code 934 need not include the second opcode. Additionally or alternatively, compiler 920 may merge one or more opcode sequences in code 924 to produce code 934 or code 954.

Interpreter 932 may be configured to execute code 934 without being configured to execute code 954. Additionally or alternatively, interpreter 952 may be configured to execute code 954 without being configured to execute code 934. Additionally or alternatively, compiler 920 may generate interpreter 932 and code 934 from code 922 or code 924 using one or more of the systems or methods discussed herein. Additionally or alternatively, compiler 920 may generate interpreter 952 and code 954 from interpreter 932 or code 934 using one or more of the systems or methods discussed herein.

In response to one or more requests from browser 944, server computer 910 may send interpreter 952 and code 954, or another set of code that is configured to be executed by interpreter 952 and not interpreter 932, to browser 944. JavaScript interpreter 946 may concurrently execute interpreter 932 executing a first set obfuscated opcode and interpreter 952 executing a second set of obfuscated opcode. The first set of obfuscated opcode may be different than the second set of obfuscated opcode. A set of opcode may comprise one or more opcodes.

In response to one or more request from browser 944 after browser 944 has received interpreter 932, server computer 910 may send a new set of code to set browser 944, and interpreter 952 may be the target processor. Server computer 910 may send code or data, such as one or more opcode mappings, finite state data, other data or code discussed herein, to browser 944, JavaScript interpreter 946, or interpreter 932, which when executed by one or more processors cause interpreter 932 to be the same type of processor as interpreter 952. Accordingly, interpreter 932 may execute the new set of code.

Code 922 or code 924 may be stored on server computer 910. Additionally or alternatively, code 922 or code 924 may be received from another server computer, shared storage system, or other computer operably coupled to server computer 910.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 11:
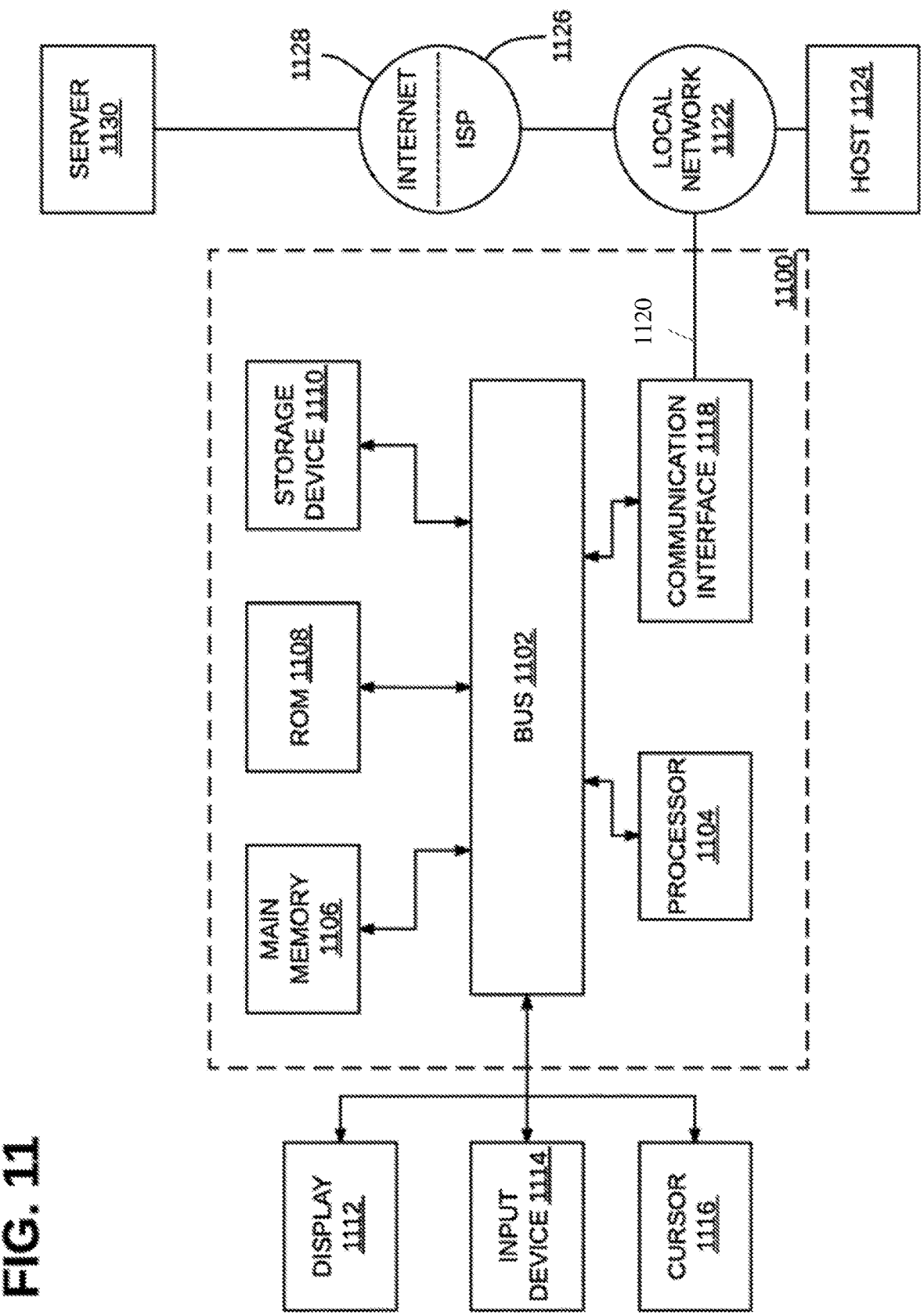
FIG. 11 illustrates a computer system upon which an embodiment may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, or stored in storage device 1110, or other non-volatile storage for later execution.

8.0 Other Aspects of Disclosure

Using the networked computer arrangements, server computer, or processing methods described herein, security in client-server data processing may be significantly increased. Obfuscation techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Aspects of the subject matter described herein are set out in the following numbered clauses:

1. A computer system comprising: one or more processors; a memory comprising one or more instructions that, when executed by the one or more processors, cause the one or more processors to: determine that a first set of code comprises a first opcode, wherein a first interpreter performs a first operation in response to the first opcode; generate a second opcode and a second interpreter, wherein the second interpreter performs the first operation in response to the second opcode, wherein the second opcode is different than the first opcode, and the second interpreter is different than the first interpreter; generate a third opcode and a third interpreter, wherein the third interpreter performs the first operation in response to the third opcode, wherein the third opcode is different than the first opcode and the second opcode, and the third interpreter is different than the first interpreter and the second interpreter.

2. The computer system of Clause 1, wherein the one or more instructions, when executed by the one or more processors, cause the one or more processors to: produce a second set of code that comprises the second opcode and the second interpreter, but not the first opcode; send the second set of code to a first client computer, wherein the first client computer comprises the first interpreter, and the first client computer performs the first operation in response to the first interpreter executing the second interpreter executing the second opcode.

3. The computer system of Clauses 1-2, wherein the one or more instructions, when executed by the one or more processors, cause the one or more processors to: produce a third set of code that comprises the third opcode and the third interpreter, but not the first opcode; send the third set of code to a second client computer, wherein the second client computer comprises the first interpreter, and the second client computer performs the first operation in response to the first interpreter executing the third interpreter executing the third opcode, without the second client computer performing the first operation.

4. A computer system comprising: one or more processors; a memory comprising one or more instructions that, when executed by the one or more processors, cause the one or more processors to: determine a first set of code and a second set of code, wherein a first interpreter generates a particular result in response to executing the second set of code; generate a third set of code and a second interpreter, wherein the second interpreter generates the particular result in response to executing the third set of code with the second interpreter; generate a fourth set of code and a third interpreter, wherein the third interpreter generates the particular result in response to executing the fourth set of code with the third interpreter; wherein the third set of code is different than the second set of code; wherein the fourth set of code is different than the second set of code and the third set of code.

5. The computer system of Clause 4, wherein the one or more instructions, when executed by the one or more processors, cause the one or more processors to: produce a fifth set of code by combining the first set of code with the third set of code and the second interpreter, but without the second set of code; send the fifth set of code to a first client computer, wherein the first client computer comprises the first interpreter, and the first client computer generates the particular result by executing the fifth set of code.

6. The computer system of Clauses 4-5, wherein the one or more instructions, when executed by the one or more processors, cause the one or more processors to: produce a sixth set of code by combining the first set of code with the fourth set of code and the third interpreter, but without the second set of code; send the sixth set of code to a second client computer, wherein the second client computer comprises the first interpreter, and the second client computer generates the particular result by executing the fifth set of code.

7. A computer system comprising: one or more processors; a memory comprising one or more instructions that, when executed by the one or more processors, cause the one or more processors to: determine a first set of code comprises a first opcode sequence and a second opcode sequence; produce a first merged opcode sequence by merging the first opcode sequence with the second opcode sequence; produce a second set of code from the first set of code comprising the first merged opcode sequence.

8. The computer system of Clause 7, wherein the one or more instructions, when executed by the one or more processors, cause the one or more processors to: determine that the first opcode sequence is independent; determine the second opcode sequence are independent.

9. The computer system of Clauses 7-8, wherein the one or more instructions, when executed by the one or more processors, cause the one or more processors to: determine one or more opcode blocks in the first set of code, wherein the first opcode sequence and the second opcode sequence are in a first opcode block in the one or more opcode blocks; determine a second opcode block in the one or more opcode blocks comprises a third opcode sequence and a fourth opcode sequence; merge the third opcode sequence with the fourth opcode sequence to produce a second merged opcode sequence; wherein the second set of code comprises the second merged opcode sequence.

10. The computer system of Clauses 7-9, wherein the one or more instructions, when executed by the one or more processors, cause the one or more processors to: determine the first set of code comprises a third opcode sequence; determine a first opcode sequence pair comprising the first opcode sequence and the second opcode sequence; determine a second opcode sequence pair comprising the first opcode sequence and the third opcode sequence; select the first opcode sequence pair; wherein the first merged opcode sequence is produced in response to selecting the first opcode sequence pair.

11. The computer system of Clauses 7-10, wherein the one or more instructions, when executed by the one or more processors, cause the one or more processors to: determine a first length for the first opcode sequence pair; determine a second length for the second opcode sequence pair; wherein the first opcode sequence pair is selected in response to determining that the first length is greater than the second length.

12. The computer system of Clauses 7-11, wherein the one or more instructions, when executed by the one or more processors, cause the one or more processors to: determine a middle opcode of the second opcode sequence; wherein producing the first merged opcode sequence comprises inserting the first merged opcode sequence before the middle opcode, and after a first opcode in the second opcode sequence.

13. A computer system comprising: one or more processors; a memory comprising one or more instructions that, when executed by the one or more processors, cause the one or more processors to: determine a first set of code comprises a first opcode block; determine the first opcode block comprises a first opcode sequence, a second opcode sequence, and a third opcode sequence; determine a first set of opcode sequence pairs for the first opcode block comprising a first opcode sequence pair and a second opcode sequence pair; wherein the first opcode sequence pair comprises the first opcode sequence and the second opcode sequence; wherein the second opcode sequence pair comprises the first opcode sequence and the third opcode sequence; select the first opcode sequence pair, and in response, produce a first merged opcode sequence by merging the first opcode sequence with the second opcode sequence; determine a second set of opcode sequence pairs comprising a third opcode sequence pair; wherein the third opcode sequence pair comprises the first merged opcode sequence and the third opcode sequence; produce a second merged opcode sequence by merging the first merged opcode sequence with the third opcode sequence; determine a third set of opcode sequence pairs; determine the third set of opcode sequence pairs is empty, and in response, determining whether a second opcode block in the first set of code comprises one or more opcode sequences; determine the second opcode block comprises a fourth opcode sequence and a fifth opcode sequence; produce a third merged opcode sequence by merging the fourth opcode sequence and the fifth opcode sequence; produce a second set of code based on the first set of code comprising the second merged opcode sequence and the third merged opcode sequence; wherein the second merged opcode sequence comprises the first merged opcode sequence.

14. The computer system of Clause 13, wherein the one or more instructions, when executed by the one or more processors, cause the one or more processors to: receive a request for the first set of code from a client computer; in response to receiving the request, send the second set of code to the client computer.

15. A computer system comprising: one or more processors; a memory comprising one or more instructions that, when executed by the one or more processors, cause the one or more processors to: determine a first set of code comprises a first opcode sequence and a second opcode sequence; produce a first merged opcode sequence by merging the first opcode sequence with the second opcode sequence; produce a second set of code from the first set of code comprising the first merged opcode sequence; produce a third set of code from the second set of code by encoding one or more opcodes in the second set of code using a first process; produce a first target processor that is configured to execute the third set of code; in response to receiving a first request from a first client computer for the first set of code, send the first target processor and the third set of code to the first client computer; wherein the first client computer executes the first target processor, which executes the third set of code; produce a fourth set of code from the second set of code by encoding the one or more opcodes using a second process that is different than the first process; produce a second target processor that is configured to execute the fourth set of code; in response to receiving a second request from a second client computer for the first set of code, send the second target processor and the fourth set of code to the second client computer; wherein the second client computer executes the second target processor, which executes the fourth set of code; wherein the third set of code is different than the fourth set of code; wherein the first target processor is different than the second target processor.

16. The computer system of Clause 15, wherein the first client computer and the second client computer are the same client computer.

17. The computer system of Clauses 15-16, wherein the first process is different than the second process.

18. The computer system of Clauses 15-17, wherein: the first process is based on a first set of pseudorandomly selected data and the second process is based on a second set of pseudorandomly selected data; the first set of pseudorandomly selected data is different than the second set of pseudorandomly selected data.

19. A non-transitory computer-readable data storage medium storing one or more sequences of instructions, which when executed cause one or more processors to perform any of the features recited in Clauses 1-18.

20. A computer program product including instructions, which when implemented on one or more processors, carries out any of the features recited in Clauses 1-18.

21. A method, which when implemented on one or more processors, carries out any of the features recited in Clauses 1-18.

What is claimed is:

1. A computing device, comprising a memory comprising programmed instructions stored thereon and at least one processor configured to be capable of executing the programmed instructions to:
generate an opcode stream from a first set of source code included in a web page, wherein the opcode stream comprises source and target opcode sequences;
determine that the source and target opcode sequences each comprise a plurality of opcodes and are independent from each other, wherein the target opcode sequence is determined to include a set of effectual opcodes;
merge the source and target opcode sequences when the determination indicates the source and target opcode sequences each comprise the plurality of opcodes and are independent from each other, wherein the merge the source and target opcodes further comprises:
identify a middle opcode in the target opcode sequence, wherein the middle opcode comprises:
a first effectual opcode of the set of effectual opcodes when target opcode is determined to include the set of effectual opcode, or
a last opcode of the target opcode sequence when the target opcode is determined to lack the set of effectual opcodes; and
insert the source opcode sequence into the target opcode sequence at a location determined based on the identified middle opcode to generate a merged opcode sequence; and
send a second set of source code generated based on the merged opcode sequence to a client in response to a request received from the client for the web page.

2. The computing device of claim 1, wherein the source and target opcode sequences are determined to be independent when each of the source and target opcode sequences lacks a position-changing opcode, a target position of a position-changing opcode, or an initial stack state that is equivalent to a final stack state.

3. The computing device of claim 1, wherein the at least one processor is further configured to be capable of executing the programmed instructions to:
determine when a first selected opcode block of a plurality of opcode blocks in the opcode stream comprises the source and target opcode sequences that are independent; and
select a second opcode block of the plurality of opcode blocks, when the determination indicates the first selected opcode block lacks source and target opcode sequences that are independent.

4. The computing device of claim 1, wherein the at least one processor is further configured to be capable of executing the programmed instructions to:
identify an additional opcode sequence in the opcode stream, wherein the source and target opcode sequences comprise a first opcode sequence pair and the source and additional opcode sequences comprise a second opcode sequence pair;
determine when a first length of the first opcode sequence pair is greater than a second length of the second opcode sequence pair; and
select the first opcode sequence pair for merging, when the first length of the first opcode sequence pair is greater than the second length of the second opcode sequence pair.

5. The computing device of claim 1, wherein the at least one processor is further configured to be capable of executing the programmed instructions to determine when the source and target opcode sequences can be merged based on when the source and target opcode sequences overlap, the source opcode sequence comes before the target opcode sequence in the opcode stream, the target opcode sequence comprises at least two opcodes, the source opcode sequence comprises an effectful opcode between an end of the source opcode sequence and a beginning of the target opcode sequence.

6. A method for source code obfuscation, the method implemented by a computing device and comprising:
generating an opcode stream from a first set of source code included in a web page, wherein the opcode stream comprises source and target opcode sequences;
determining that the source and target opcode sequences each comprise a plurality of opcodes and are independent from each other, wherein the target opcode sequence is determined to include a set of effectual opcodes;
merging the source and target opcode sequences when the determination indicates the source and target opcode sequences each comprise the plurality of opcodes and are independent from each other, wherein the merge the source and target opcodes further comprises:
identifying a middle opcode in the target opcode sequence, wherein the middle opcode comprises:
a first effectual opcode of the set of effectual opcodes when target opcode is determined to include the set of effectual opcode, or
a last opcode of the target opcode sequence when the target opcode is determined to lack the set of effectual opcodes; and inserting the source opcode sequence into the target opcode sequence at a location determined based on the identified middle opcode to generate a merged opcode sequence; and sending a second set of source code generated based on the merged opcode sequence to a client in response to a request received from the client for the web page.

7. The method of claim 6, wherein the source and target opcode sequences are determined to be independent when each of the source and target opcode sequences lacks a position-changing opcode, a target position of a position-changing opcode, or an initial stack state that is equivalent to a final stack state.

8. The method of claim 6, further comprising:
determining when a first selected opcode block of a plurality of opcode blocks in the opcode stream comprises the source and target opcode sequences that are independent; and
selecting a second opcode block of the plurality of opcode blocks, when the determination indicates the first selected opcode block lacks source and target opcode sequences that are independent.

9. The method of claim 6, further comprising:
identifying an additional opcode sequence in the opcode stream, wherein the source and target opcode sequences comprise a first opcode sequence pair and the source and additional opcode sequences comprise a second opcode sequence pair;
determining when a first length of the first opcode sequence pair is greater than a second length of the second opcode sequence pair; and
selecting the first opcode sequence pair for merging, when the first length of the first opcode sequence pair is greater than the second length of the second opcode sequence pair.

10. The method of claim 6, further comprising determining when the source and target opcode sequences can be merged based on when the source and target opcode sequences overlap, the source opcode sequence comes before the target opcode sequence in the opcode stream, the target opcode sequence comprises at least two opcodes, the source opcode sequence comprises an effectful opcode, or one or more effectful opcodes are between an end of the source opcode sequence and a beginning of the target opcode sequence.

11. A non-transitory computer readable medium having stored thereon instructions for source code obfuscation comprising executable code, which when executed by at least one processor, cause the at least one processor to:
generate an opcode stream from a first set of source code included in a web page, wherein the opcode stream comprises source and target opcode sequences;
determine that the source and target opcode sequences each comprise a plurality of opcodes and are independent from each other, wherein the target opcode sequence is determined to include a set of effectual opcodes;
merge the source and target opcode sequences when the determination indicates the source and target opcode sequences each comprise the plurality of opcodes and are independent from each other, wherein the merge the source and target opcodes further comprises:

identify a middle opcode in the target opcode sequence, wherein the middle opcode comprises:
a first effectual opcode of the set of effectual opcodes when target opcode is determined to include the set of effectual opcode, or
a last opcode of the target opcode sequence when the target opcode is determined to lack the set of effectual opcodes; and
insert the source opcode sequence into the target opcode sequence at a location determined based on the identified middle opcode to generate a merged opcode sequence; and
send a second set of source code generated based on the merged opcode sequence to a client in response to a request received from the client for the web page.

12. The non-transitory computer readable medium of claim 11, wherein the source and target opcode sequences are determined to be independent when each of the source and target opcode sequences lacks a position-changing opcode, a target position of a position-changing opcode, or an initial stack state that is equivalent to a final stack state.

13. The non-transitory computer readable medium of claim 11, wherein the executable code, when executed by the at least one processor, further causes the at least one processor to:
determine when a first selected opcode block of a plurality of opcode blocks in the opcode stream comprises the source and target opcode sequences that are independent; and
select a second opcode block of the plurality of opcode blocks, when the determination indicates the first selected opcode block lacks source and target opcode sequences that are independent.

14. The non-transitory computer readable medium of claim 11, wherein the executable code, when executed by the at least one processor, further causes the at least one processor to:
identify an additional opcode sequence in the opcode stream, wherein the source and target opcode sequences comprise a first opcode sequence pair and the source and additional opcode sequences comprise a second opcode sequence pair;
determine when a first length of the first opcode sequence pair is greater than a second length of the second opcode sequence pair; and
select the first opcode sequence pair for merging, when the first length of the first opcode sequence pair is greater than the second length of the second opcode sequence pair.

15. The non-transitory computer readable medium of claim 11, wherein the executable code, when executed by the at least one processor, further causes the at least one processor to determine when the source and target opcode sequences can be merged based on whether the source and target opcode sequences overlap, the source opcode sequence comes before the target opcode sequence in the opcode stream, the target opcode sequence comprises at least two opcodes, the source opcode sequence comprises an effectful opcode, or one or more effectful opcodes are between an end of the source opcode sequence and a beginning of the target opcode sequence.

* * * * *